United States Patent [19]

Page

[11] Patent Number: 4,467,220

[45] Date of Patent: * Aug. 21, 1984

[54] POWER SWITCHING APPARATUS

[76] Inventor: Ronald Page, 3750 Edgemont Blvd., Vancouver, B.C., Canada, V7R 2P8

[*] Notice: The portion of the term of this patent subsequent to Jan. 27, 1998 has been disclaimed.

[21] Appl. No.: 477,591

[22] Filed: Mar. 25, 1983

Related U.S. Application Data

[63] Continuation-in-part of Ser. No. 314,862, Oct. 26, 1887, abandoned, which is a continuation-in-part of Ser. No. 218,480, Dec. 22, 1980, abandoned, which is a continuation of Ser. No. 878,310, Feb. 16, 1978, Pat. No. 4,247,787.

[51] Int. Cl.³ .......................... H02B 1/24; H02J 4/00
[52] U.S. Cl. ..................................... 307/19; 307/112; 307/113; 307/86; 361/62
[58] Field of Search ....................... 307/11, 12, 13, 42, 307/112, 113, 132 R, 86; 361/62

[56] References Cited

U.S. PATENT DOCUMENTS

| | | | |
|---|---|---|---|
| 1,955,311 | 4/1934 | Parsons | 307/112 |
| 3,291,914 | 12/1966 | Bowers | 179/18 |
| 4,247,787 | 1/1981 | Page | 307/112 |

OTHER PUBLICATIONS

Electric Utility Systems and Practices by General Electric Company, 1974.

*Primary Examiner*—E. A. Goldberg
*Assistant Examiner*—Derek Jennings
*Attorney, Agent, or Firm*—Laff, Whitesel, Conte & Saret

[57] ABSTRACT

A switching device that relates to the arrangement of a switching network for use within an electrical power distribution system. There is an improved security of power delivery to various loads while at the same time enabling a reduction in the number of required circuit breakers and related gear. This network also presents additional options in design and operating modes, when applied to distribution systems. These options result in a reduction in the total installed capacity of the sources together with reduced continuous current and fault current ratings of conductors and interconnected apparatus. The invention provides a switching network has six conducting branches, each branch containing at least one switching means such as a circuit breaker. The branches are connected at their ends to form four 3-sided rings, each branch forming a side of and being shared by two of the rings. As a result, four triple-connected nodes are formed at the end connection points of the branches while the connections between adjacent pairs of switching device within a branch form double-connected nodes. These nodes serve as points for connection thereto of source/load elements, and each node is isolatable from the other nodes by the opening of a maximum of three of the switching device.

26 Claims, 44 Drawing Figures

POWER SWITCHING APPARATUS

This is a continuation-in-part of U.S. patent application Ser. No. 314,862, filed Oct. 26, 1981, which in turn was a continuation-in-part of application Ser. No. 218,480 filed Dec. 22, 1980 (both now abandoned) which, in turn, is a continuation of Ser. No. 878,310, filed Feb. 16, 1978 (now U.S. Pat. No. 4,247,787).

This invention relates to the arrangement of a switching network for use within an electrical utility station switchyard or power distribution system, which network improves the security of power delivery to various loads while at the same time enabling a reduction in the number of required circuit breakers and related gear.

The embodiments of the invention are applicable to systems operating on direct current, single phase alternating current, or polyphase alternating current. A hybrid embodiment provides a composite arrangement wherein the network is connected to polyphase sources and loads but the internal branches of said network operate at single phase.

Electrical power switchyards and power distribution networks provide locations where input power sources are interconnected to improve the security of supply to various loads. Transformers are utilized to step up or down a source of voltage to match the required load voltage. The transformers are normally connected to switching networks containing a plurality of circuit breakers and connection points to which the load lines and source lines are connected. A fault, such as a short circuit to ground or between lines, occurring at the utility station switchyard or associated with the source or load lines requires interruption of the fault by the opening of those circuit breakers which carry the fault current to the fault location. While the fault can be isolated in this manner, the remaining loads should remain unaffected by the fault, and therefore it is desirable to provide redundant power feeding paths to each load.

In design practice, it is customary to minimize the number of circuit breakers within a given switching network because these breakers may be the most costly devices therein. Each source and load element must have at least one circuit breaker to isolate it from the rest of the network. The circuit breakers themselves must be disconnected from the network periodically for inspection and maintenance. Therefore, it is common practice to design networks wherein each source and load element is connected into the network through more than one circuit breaker to ensure continuity of connection to each of said elements even though some circuit breakers are disconnected for inspection and maintenance.

To generalize, a given switching network with the number of circuit breakers therein denoted as "X" will provide the required switching functions for a number of connected source and load elements denoted as "E". The ratio of these two numbers, that is X:E, is a figure of merit which provides a means for comparing the efficiency of circuit breaker usage among the various possible designs for a given substation. For example, consider two networks proposed for the same substation as follows:

The first network has nine circuit breakers and six source and load elements. Therefore, the ratio $X:E = 9:6 = 1\frac{1}{2}:1$ The second network has eight circuit breakers and the same six source and load elements. Therefore, the ratio $X:E = 8:6 = 1\frac{1}{3}:1$ Clearly, the first network is more costly than the second since it requires nine circuit breakers instead of only eight. This is confirmed by comparison of their respective ratios since $1\frac{1}{2}:1$ is a larger ratio than $1\frac{1}{3}:1$. In the utility industry, it is customary to abbreviate these ratios and state them as a single number, for example, as "$1\frac{1}{2}$" and "$1\frac{1}{3}$" for the above two networks respectively. Since each source and load element must have at least one associated breaker to isolate it from the rest of the network, it is believed to be clear that the minimum obtainable ratio is "1" and that this will correspond to the cheapest network.

One prior art structure which has been used successfully is a ring bus in which there is a multiplicity of circuit breakers connected around a conductive ring. At locations between the circuit breakers, terminations are provided for the connection of sources and load elements. It can be seen that each load element is fed from both directions in the ring, i.e., the current path to each load is double redundant.

Should a fault occur, the two circuit breakers adjacent to the fault are tripped (opened), which of course opens the ring. Consequently, for some elements, the double redundant supply is lost since certain loads may not be located in the remaining ring segment, between a pair of power sources. That is, the security of the supply for some loads is compromised; no redundancy remains for them once the ring has been opened.

Furthermore, if the fault occurs in certain of the load positions, power may have to flow to the remaining loads through an excessive number of breaker contacts. For the ring having N circuit breakers, the power could flow through as many as N-2 sets of circuit breaker contacts, whereas previously the power need only have flowed through N/2 sets of contacts at most.

Nevertheless, the ring bus system is still used for some systems in which the criticality is not great, because there is still some security present due to the doubly redundant power paths when fully operative, and since it requires the smallest number of circuit breakers for this form of redundant system. In the ring bus form of system, there are as many source and load termination points as there are circuit breakers; i.e., the ratio of circuit breakers to elements is "1".

It will be noted that the power source line and load line terminations both occur in the same switching network and consequently they will be referred to as source/load elements or simply as elements, in this specification.

More elaborate electric power utility station switchyards utilize a different scheme in which there are a pair of main power carrying buses between which are connected branches having serial circuit breakers so as to form a multiplicity of intermeshed rings. An element termination can be made between pairs of circuit breakers. If one element must be switched out of service, there is usually at least one pair of the branches left interconnected in an electrically closed ring condition so that the overall system security is not seriously jeopardized. However, the efficiency of utilization of circuit breakers is not as good as the aforenoted ring bus system, common ratios of circuit breakers to elements being "2", "$1\frac{1}{2}$" or "$1\frac{1}{3}$".

It is preferred that no source/load element be connected to the main buses since a fault on either of the buses requires the tripping of all circuit breakers immediately adjacent to the affected bus in order to clear the fault. This results in the opening of all of the branches between the buses, and hence opening all intermeshed rings, jeopardizing substantially the security of the operative loads. Consequently, in North American practice, it is usual that only secure loads are allowed to be connected to the main buses. It should be noted that the limited utilization of the main buses is one of the factors degrading the ratio of circuit breakers to elements.

The ratio of circuit breakers to elements is an important factor since the cost of switchgear is high and efficiency in its use is desirable, particularly in large stations.

In the present invention, however, the ratio of circuit breakers to elements is very low, and particularly for larger stations, approaches the minimal value of "1". The present switching network does not require the use of main buses, and interconnects the various branches in a mesh. If isolation of a fault is required, a large portion of the remaining network remains intact with redundant power feeding paths. Consequently, the present invention provides a switching network having a relatively more secure system, and with decreased cost of circuit breakers and related apparatus.

This invention is a switching network comprising six conducting branches, each branch containing at least one switching means such as a circuit breaker. The branches are connected at their ends to form four three-sided rings, each branch forming a side of and being shared by two of the rings. As a result, four triple-connected nodes are formed at the end connection points of the branches for connection thereto of source/load elements, and each node is isolatable from the other nodes by the opening of a maximum of three of the switching means.

A better understanding of the invention will be obtained by reference to the detailed description below, with reference to the following drawings which are in single-line schematic form unless qualified otherwise in the discussion:

Figure 8A:
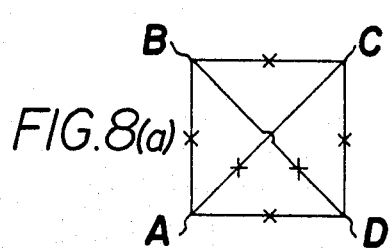
Figure 8B:
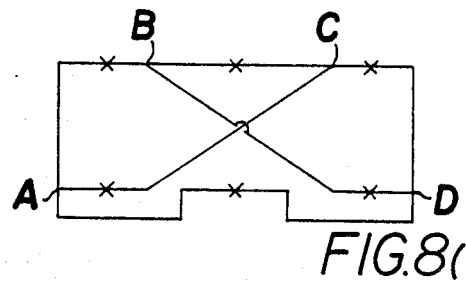
Figure 8C:
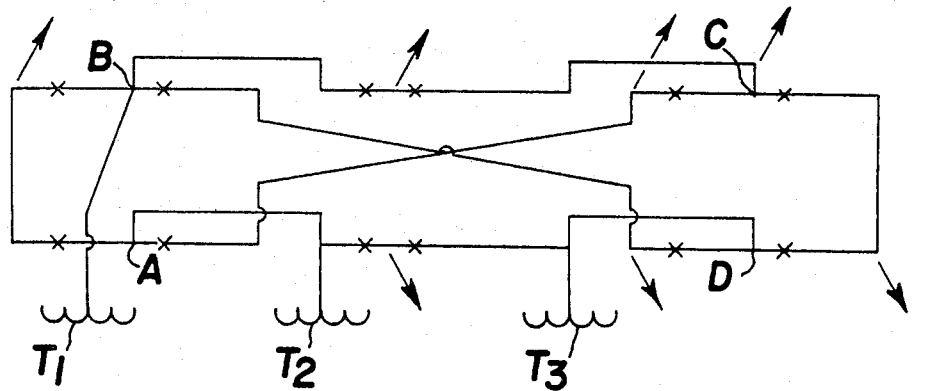
Figure 3A:
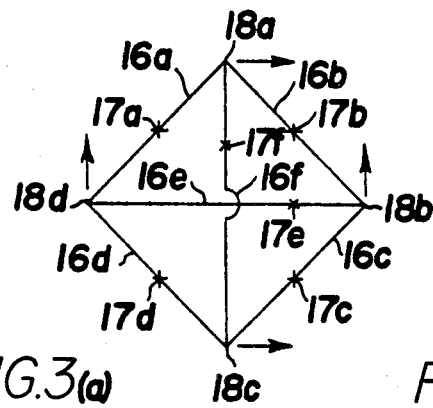
Figure 3B:
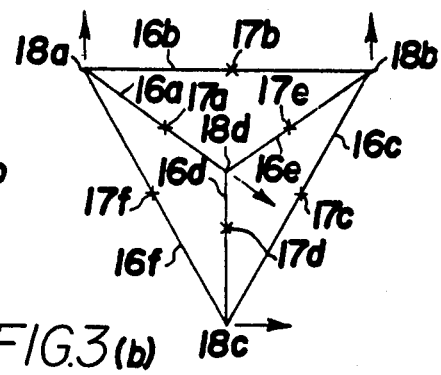
Figure 4A:
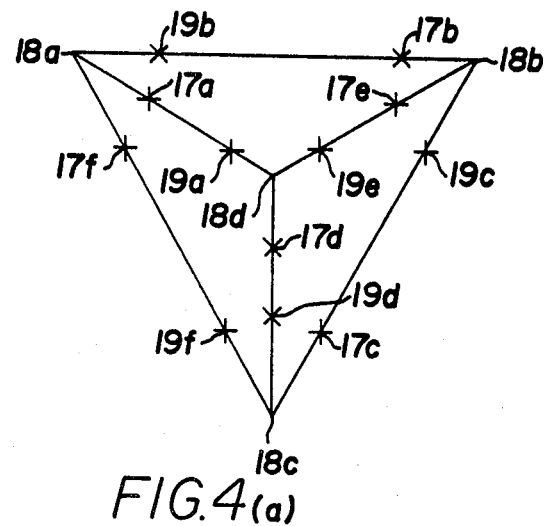
Figure 9A:
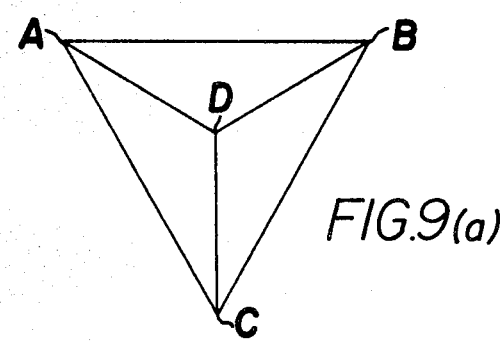
Figure 9B:
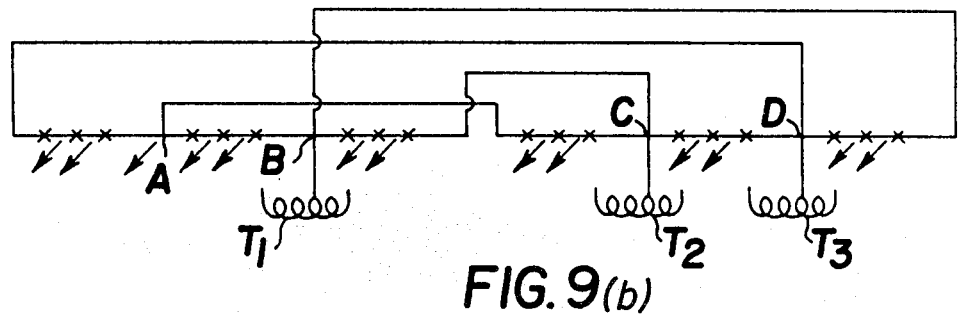
Figure 10A:
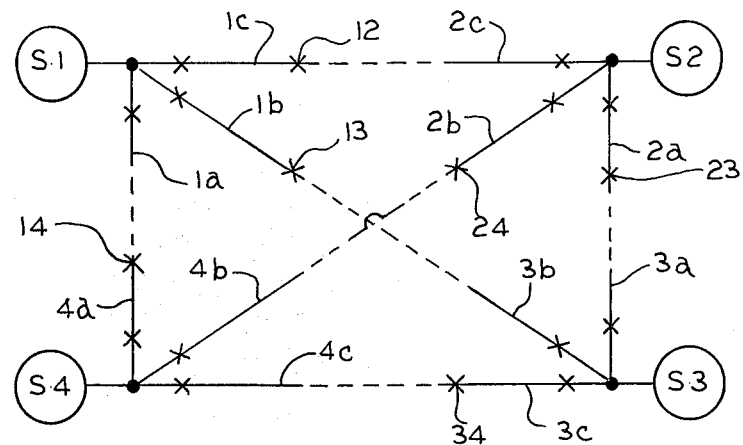
Figure 10B:
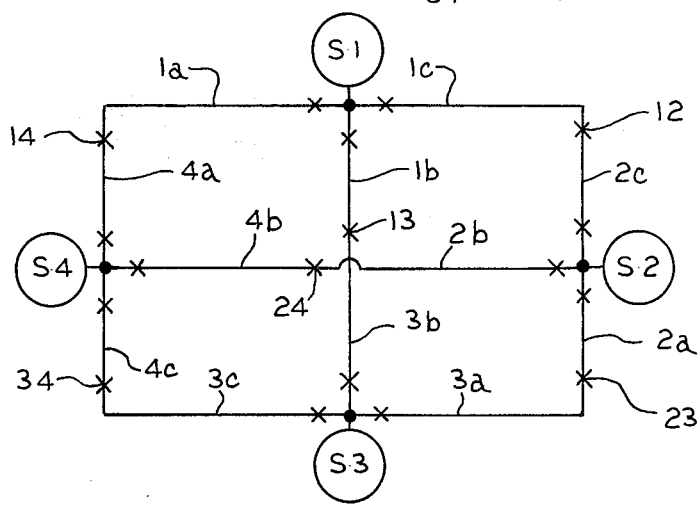
Figure 10C:
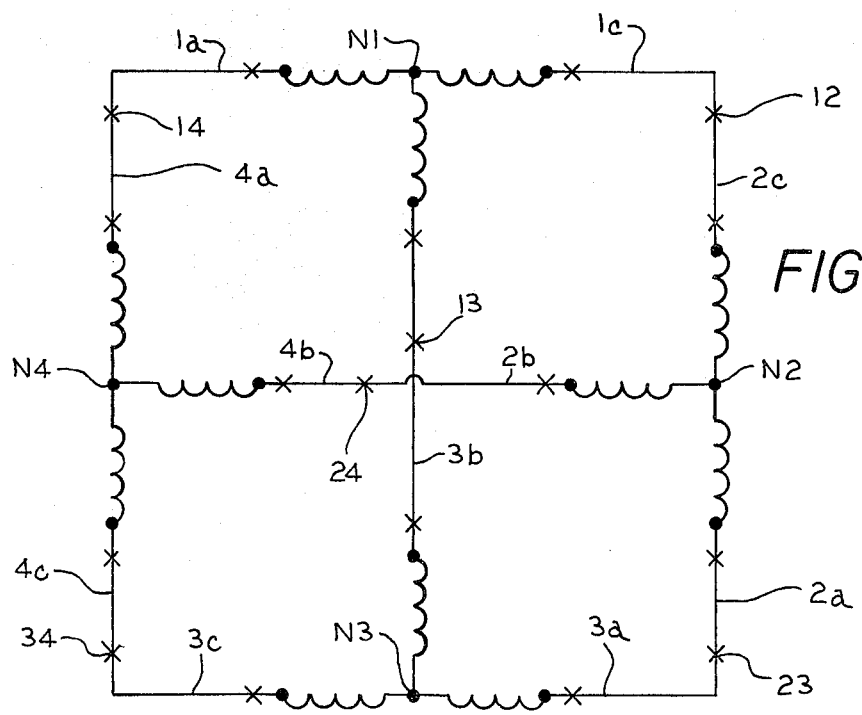
Figure 11A:
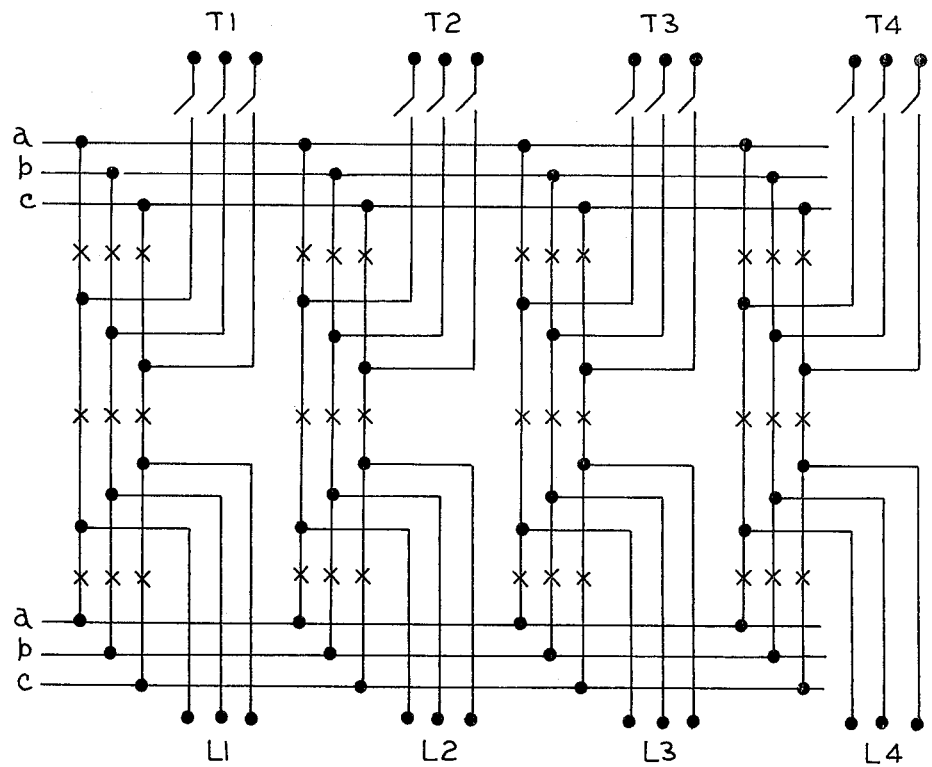
Figure 11B:
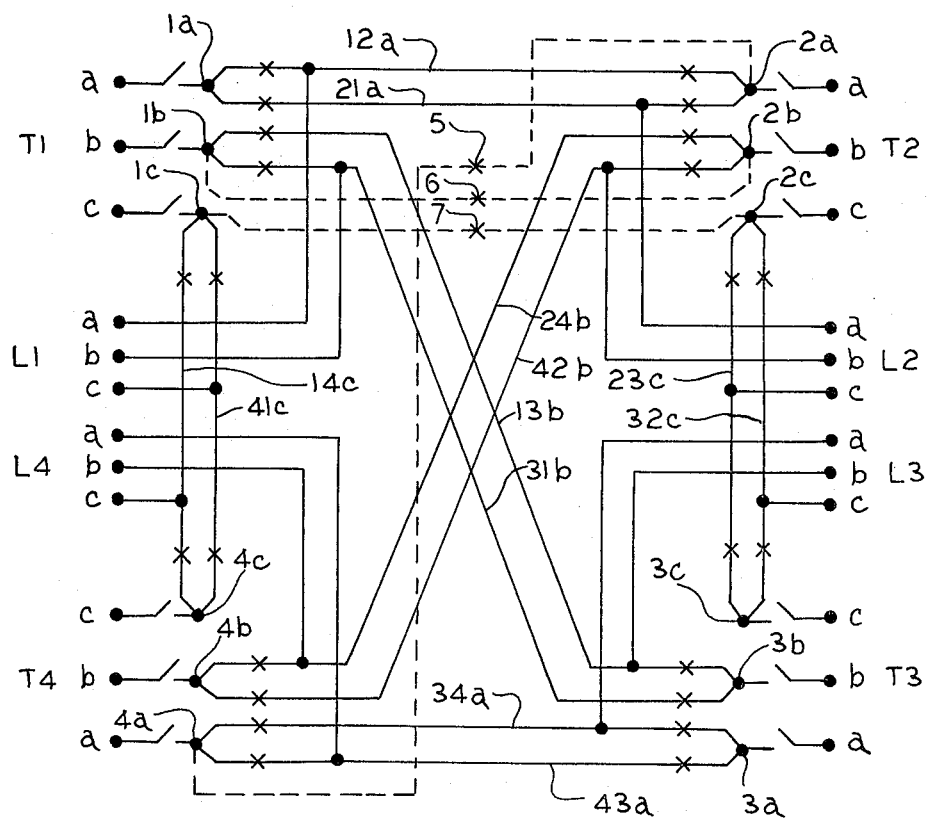
Figure 12:
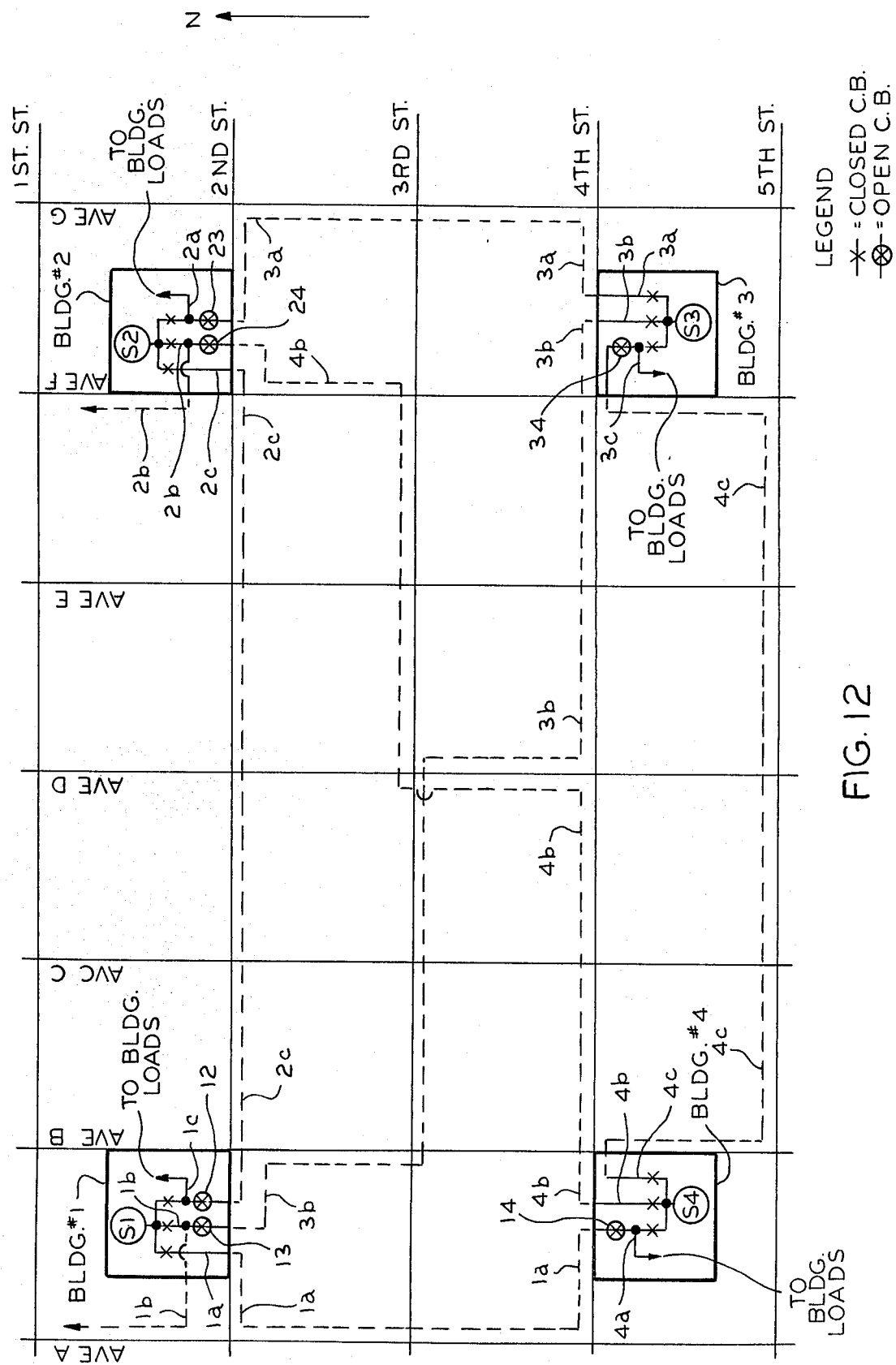

FIGS. 3a, b, c, and d show four geometric representations of the simplest form of the present invention;

FIGS. 4a and b show one of the geometric representations of the invention accommodating various numbers of source/load elements;

FIGS. 5a, 5b, 6a, 6b, 7a and 7b show one of the geometric representations of the invention accommodating various numbers of source/load elements in both schematic and more pictorial forms;

FIGS. 8a-8c (which is on the same sheet as FIG. 2) and FIGS. 9a and 9b show one of the geometric representations of the invention in schematic and more pictorial forms which illustrate the use of compressed gas insulated switchgear;

FIGS. 10a-10c illustrates an application of the invention and a modified or hybrid version thereof to distribution systems;

FIG. 11a illustrates a prior art and FIG. 11b illustrates a modified or hybrid embodiment of the invention; and FIG. 12 illustrates an application of the invention to modular substations for urban distribution, and FIGS. 13a-13h, 14a-14h and 15a-15d illustrate how rectangular switchyard layout arrangements and additional expanded forms of the invention can be logically derived from the schematic representations shown in FIG. 3a and 3b.

Throughout this specification, the word "branch" must be interpreted with regard to the intended application of the switching network. Thus, if the network were to be used to interconnect D.C. sources and loads, each branch shown in the drawings could be built with a single conductor.

If the network were used to interconnect three-phase A.C. sources and loads, each branch would have a set of three conductors; one each for the three phases and conventionally designated "a", "b", and "c". Unless otherwise qualified, all drawings and descriptions throughout this specification are intended to apply to such three-phase A.C. switching networks. It is to be noted that none of the drawings, except FIG. 10c and FIG. 11a attached, show each phase explicitly - instead they appear to represent only one conductor per branch. This representation is a common practice throughout the electrical utility industry and is employed to simplify the preparation of drawings. It is also conventional practice to denote this simplified representation of polyphase A.C. circuits by referring to such drawings as "single-line diagrams".

The drawings in FIG. 10c and FIG. 11 are presented in sufficient detail to show connections for each phase in a modified or hybrid embodiment of the invention wherein three-phase sources and loads are interconnected by a switching network whose branches operate at single phase. FIG. 10c employs single conductors for each branch whereas FIG. 11 employs two conductors in parallel in each branch, as will be discussed subsequently. FIG. 12 illustrates how the principles of the invention may be expanded to provide power distribution over a widespread area, here an exemplary area of twenty-four city blocks.

A convention will be used herein for elements shown in the drawings, in which a circuit breaker is depicted as an "X" on a network branch, and a source/load element is depicted as an arrow leading from a node or other termination point. A dashed line depicts a network branch segment which is located physically higher than other branch segments in order to separate conductors at crossover points; a dashed-line arrow depicts an overhead cable connection to a source/load line; and a dashed "X" denotes the location for an added circuit breaker at some future time.

Figure 1:
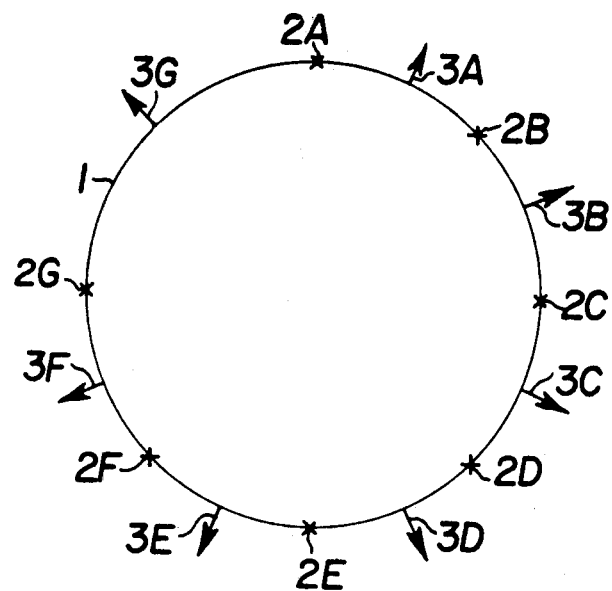
FIG. 1 shows a prior art ring bus system.

FIG. 1 shows a prior art ring bus structure. The conductive bus 1 is connected in a ring form. Circuit breakers 2A-2G are serially connected around the bus. Source/load elements 3A-3G are serially connected around the bus. Source/load elements 3A-3G are individually connected to the ring bus at the nodes between the circuit breakers. For instance, source/load element 3A is connected to ring bus 1 between circuit breakers 2A and 2B.

Should a fault occur on element 3A, for example, circuit breakers 2A and 2B will be tripped, effectively opening the ring and isolating source/load element 3A. The remainder of the ring is fed by a source of power connected to any of the remaining nodes 3B-3G, and load elements are connected to the other nodes.

Should the source of power be connected to element 3B, it will be seen that after breakers 2A and 2B open there is only a single power path feeding around the ring to element 3G, because the redundancy was lost. Should a fault occur now on element 3D, circuit breakers 2D and 2E will open, effectively removing power from elements 3E, 3F and 3G although there is no associated fault. Clearly, once the ring is opened, the doubly redundant system (whereby power is fed to every load element through two parallel paths) is removed, and the security of the remaining system is jeopardized.

It should be noted that the number of circuit breakers and source/load elements in this system is equal in number, providing a ratio of "1", which is considered highly desirable and economical.

Figure 2:
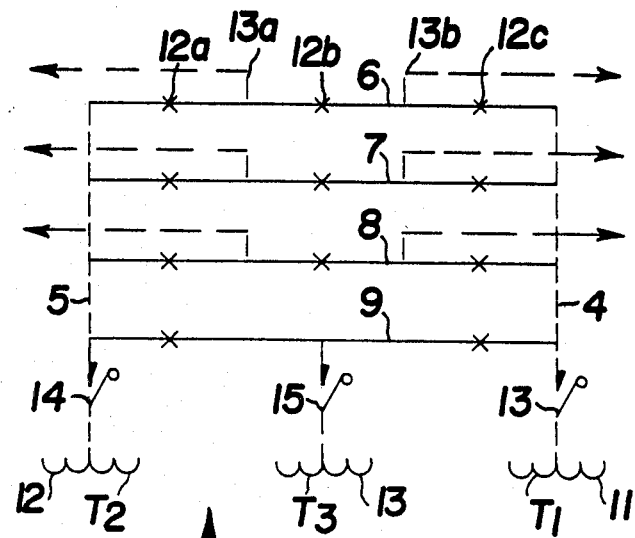
FIG. 2 is a more complex prior art system.

FIG. 2 shows a prior art system in which two main buses 4 and 5 are employed to connect branch buses 6, 7, 8 and 9 in parallel. Each of the branch buses 6, 7, 8 and 9 is connected between the two buses 4 and 5 so as to form a multiplicity of rings. The main buses are connected to transformers 11 and 12, and a third transformer 13 is connected to a central portion of branch bus 9.

FIG. 2 shows a system in which three serially connected circuit breakers are present in each of branch buses 6, 7 and 8. For instance, branch bus 6 is comprised of circuit breakers 12a, 12b, and 12c. Elements 13a and 13b are connected to the junctions between pairs of circuit breakers.

As noted earlier, it is undesirable to have load elements connected to buses 4 and 5, since if a fault should occur associated with one of these buses, the circuit breakers in each of the four branch buses adjacent to the faulted main bus would have to be opened, isolating not only the faulty load, but also opening all of the multiple rings. Consequently, the security of the system would be jeopardized.

Nevertheless, in FIG. 2, the transformers 11 and 12 are connected to the main buses to minimize the required number of circuit breakers. However, switching of transformers 11 and 12 by action of the four circuit breakers adjacent to each of the main buses is avoided for all routine (non-fault) operations by appropriately actuating their associated disconnect switches 13 and 14. For this purpose, these two disconnect switches must have special interrupting and magnetizing current switching capabilities and are known in the utility industry as "circuit switchers". Transformer 13, which is not connected to one of the main buses, is isolatable using a less critical disconnect switch 15.

If a fault should occur for instance on element 13a, circuit breakers 12a and 12b are tripped, opening the circuit and isolating element 13a from its dually redundant connection into the network. Element 13b is connected through circuit breaker 12c to bus 4, and element 13b has lost its redundant connection through circuit breaker 12b. The security of branch buses 7, 8 and 9 is not affected, since they are still locked into closed rings.

The economy of this system will be observed by considering the ratio of circuit breakers to source/load elements. This system utilizes eleven circuit breakers for six transmission line positions and three transformer positions. In addition, two special isolation switches are used. Branches 6, 7 and 8 each have three circuit breakers and two elements. If all branches were so constructed, the overall ratio of circuit breakers to elements would be "1½" and such a configuration is known in the industry as a "breaker and one-half scheme". However, branch 9 has only two breakers and single element 15 and so the comparable ratio for this branch is "2". Also, elements 13 and 14 connect directly to main buses 4 and 5 respectively without any breakers. Because of these departures from the constant ratio "1½", applicable to branches 6, 7 and 8, the network of FIG. 2 is known in the industry as a "modified breaker and one-half scheme".

To obtain the increased redundancy, more switching means are required to service a given number of elements than the ring bus system of FIG. 1. The costs are therefore considerably increased.

FIG. 3 depicts the basic form of the present invention rearranged in four different ways. Considering FIG. 3a, the switching network is comprised of six conducting branches 16a-16f. Each branch contains at least one circuit breaker 17a-17f or other switching means. The branches are connected at their ends so as to form four three-sided rings. A careful consideration of FIG. 3a will show that each branch forms the side of and is shared by two of the rings.

As a result, four triple-connected nodes, 18a, 18b, 18c and 18d are formed at the end connection points of the branches, where source/load elements can be connected.

Each node is isolatable from the other nodes by the opening of a maximum of three of the circuit breakers. For instance, should a fault occur at the element connected to node 18a, circuit breakers 17a, 17f, and 17b will trip, effectively isolating node 18a from the remainder of the system.

However, consider the remaining nodes 18b, 18c and 18d. Each of these nodes remain doubly redundant, since there are two paths through which power can flow thereto.

Figure 3C:
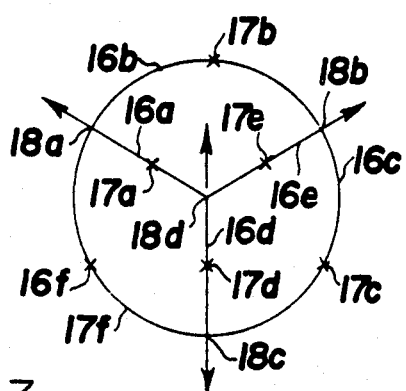
Figure 3D:
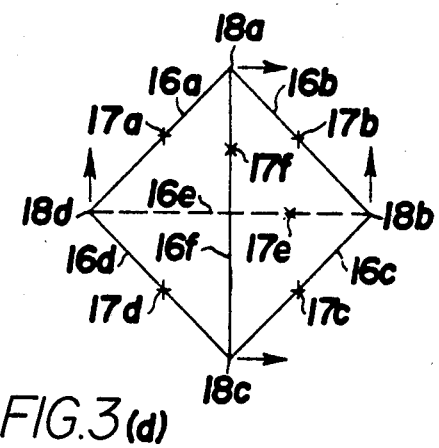

FIGS. 3b, 3c and 3d are similar to FIG. 3a, but reconfigured in space to provide various physical representations for illustration. They are otherwise electrically equivalent to FIG. 3a. The reference numerals used are similar to FIG. 3a. Each circuit consists of four nodes and six branches. For further ease of description, the form of the invention can therefore be referred to as a "4×6 network".

In FIG. 3a, the 4×6 network has a double-crossed ring; FIG. 3b shows that the same network may be considered as four intermeshed rings each containing three branches; FIG. 3c illustrates the same network, but has a ring divided into three segments by three radially oriented branches which are themselves joined together at the centre; FIG. 3d shows the 4×6 network as the outline edges of the four faces of a tetrahedron.

Since each of six branches contains one circuit breaker and there are four nodes for elements, this simplest network is clearly a breaker and one-half configuration. It should be noted, however, that instead of the prior art form of a pair of main buses present, there are four separated nodes, any one of which can be isolated from the other nodes by opening no more than three circuit breakers. Since the remaining nodes are still locked into a closed ring after isolation of any one of the nodes, the security of the remaining three nodes is maintained.

FIG. 4 shows the basic configuration of FIG. 3b, for example, which is expanded to accommodate more than four source/load elements. Additional circuit breakers can be added in any or all of the six branches. Each additional circuit breaker is connected into a given branch to provide an added doubly-redundant nodal or connection position for the connection of another source/load element. For example, in FIG. 4a, each of the branches contains an additional circuit breaker 19a-19f. The locations between each pair of circuit breakers 17a-19a, 17b-19b, 17c-19c, etc. provide the additional nodal positions for the connection of additional source/load elements. This configuration therefore provides for four triple-connected nodes and six double-connected nodes, to accommodate the connection of ten elements. There are twelve circuit breakers present, giving a ratio of circuit breakers to elements of "1 1/5" for this two circuit breaker per branch system.

Figure 4B:
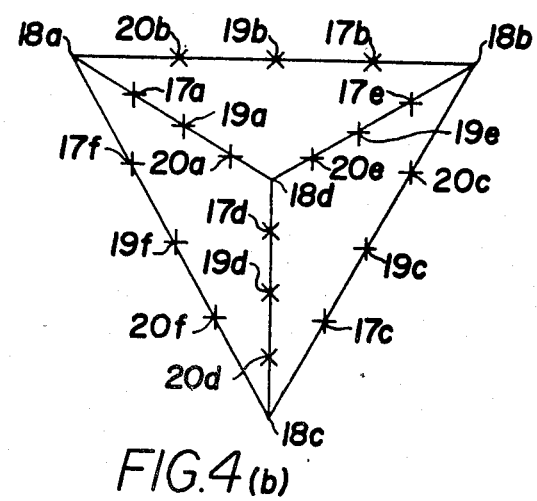

FIG. 4b shows a further expanded system, in which an additional circuit breaker has been added to each branch to accommodate more elements. The additional circuit breakers are referenced as 20a-20f. Therefore, twelve double-connected nodes are formed between circuit breakers for connection of source/load elements as well as four triple-connected nodes, giving a total combination of sixteen possible elements. Eighteen circuit breakers are used, giving a ratio of "1 ⅛" circuit breakers per element for this three circuit breaker per branch network.

In a similar manner larger networks can be built up. For example, a four circuit breaker per branch system contains four triple connected nodes and eighteen double connected nodes for possible accommodation of twenty-two elements with twenty-four circuit breakers. The ratio is thus 1 1/11 circuit breakers per element. It is believed clear that as the number of nodes increases, the ratio approaches "1" and the efficiency of utilization of circuit breakers increases.

A prior art breaker and one-third system would have required thirty circuit breakers to switch the same twenty-two elements rather than twenty-four as in the present network. Moreover, during the process of any single fault being cleared by the tripping of appropriate circuit breakers in the present network, the majority of the system remains uncompromised on at least one closed ring. Thus, examination of FIGS. 4a and 4b will verify that a fault on a single element attached to any double-redundant node necessitates protection system tripping action which electrically opens only one branch but always leaves two intermeshed rings closed and undisturbed and a fault on a single element attached to any triple-redundant node necessitates protection system tripping action which electrically opens three branches but always leaves the other three branches secure and undisturbed in the form of a closed ring. Clearly the 4×6 switching network is superior in security at the same time as being more economical in the utilization of circuit breakers and associated switchgear than the prior art systems.

For any 4×6 switching network there is a fixed relationship between the number "n" of the source/load elements and the required number "N" of circuit breakers. This relationship can be expressed as $$N=n+2, \text{ or } n=N-2.$$

Therefore, $N/n=(n+2)/n$ and this ratio approaches "1" for large values of n.

In other words, the number, "N", of circuit breakers required to form a 4×6 switching network which will accommodate "n" source/load elements is only two more than is required for a single ring with "n" source/load positions. The "extra" two circuit breakers are necessary to form the basic 4×6 network configuration. Beyond this, as the power switching station expands, each additional circuit breaker provides an additional source/load element position so that with increasing requirement for source/load element positions, the ratio of circuit breakers to source/load elements approaches "1". The prior art "2" "1½" and "1⅓" circuit breaker schemes do not provide this economy in circuit breaker usage since the first source/load element in each added new branch requires two circuit breakers.

Large stations utilizing the prior art "2", "1½" or "1⅓" circuit breaker schemes may each have six or more circuit breakers connected to each of the main buses. This is undesirable because it must be recognized that as the number of circuit breakers connected to a bus zone increases, so also is there a corresponding increased statistical probability of misoperation. In the 4×6 network there are never more than three circuit breakers connected to a zone and there are only four such three circuit breaker zones. Back-up tripping of adjacent circuit breakers in the event of a circuit breaker failure never requires tripping of more than two adjacent circuit breakers. In contrast, for prior art "2", "1½" or "1⅓" circuit breaker schemes, failure of any circuit breaker connected to a main bus requires back-up tripping of all other circuit breakers connected to that same bus. Thus, in addition to the degradation of station security due to possible breaker failure, the prior art "2", "1½" and "1⅓" circuit breaker schemes incur an additional penalty in their requirement for more extensive relaying to provide breaker failure back-up protection.

Figure 5A:
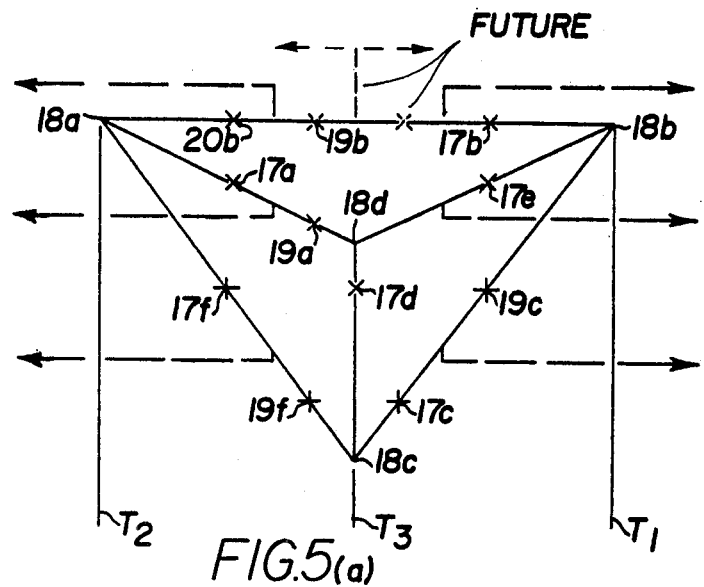
Figure 5B:
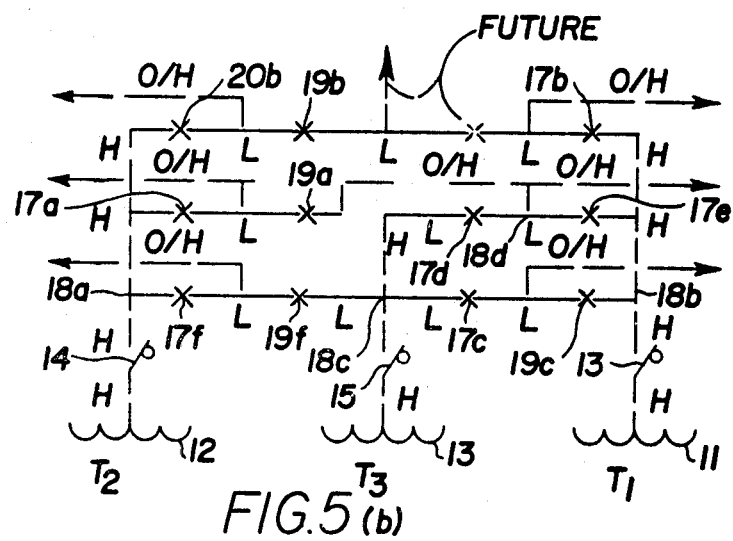

FIGS. 5a and 5b are equivalent single-line diagrams of the 4×6 network which will satisfy the switching requirements of the prior art network shown in FIG. 2. FIG. 5a illustrates the scheme of connections for the 4×6 network while FIG. 5b portrays the rectangular placement of buswork and switchgear for a typical 4×6 switchyard layout. It can be verified that FIG. 5b is a 4×6 network by comparing its components with those of FIG. 5a. Both FIGS. 5a and 5b use the same reference numerals designated in FIGS. 4a and 4b. It should be noted that the numbers of circuit breakers in some of the six branches of FIG. 5a are not evenly distributed, and were chosen to simplify the physical connections represented in FIG. 5b for a typical 500 KV, three phase AC switchyard utilizing conventional outdoor switchgear connected with industry standard "low-profile" tubular bus work set at two levels to facilitate conductive crossovers. A third level of conductor is provided by the employment of standard overhead cables. The high buswork is labelled "H", the low bus work has "L" and the overhead cable has O/H. The designations T1, T2 and T3 designate the locations for connection of transformers.

It should be noted that ordinary disconnect switches 13, 14 and 15 need only be used (FIG. 5b) rather than complex circuit switchers as the node to which each transformer is connected can be isolated by opening of only three circuit breakers while the majority of the network remains in a secure ring form. The cost is therefore further reduced from the prior art.

A further circuit breaker and node are shown in dashed line between 17b and 19b to indicate an example of where a further circuit breaker can be added and a further source/load element connected for expansion of the 4×6 network.

Figure 6A:
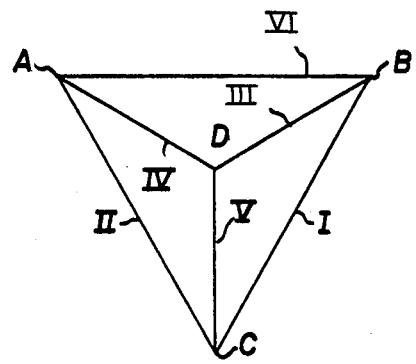
Figure 6B:
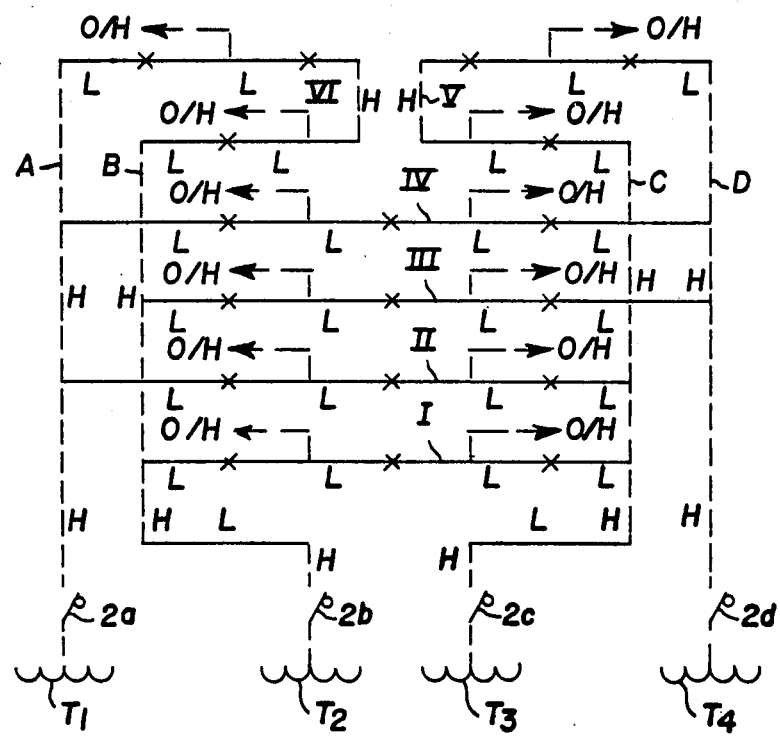

FIG. 6 illustrates a low profile outdoor switchgear embodiment of the 4×6 network having three circuit breakers per branch as represented schematically in FIG. 4b. The scheme of branch connections to form the 4×6 network is shown as FIG. 6a and the equivalent physical network arrangement is portrayed in FIG. 6b. For ease of understanding this configuration, the circuit breakers have not been given reference numerals, but are merely shown schematically. However, the corresponding branches of FIG. 6a and 6b have been referenced in corresponding Roman numerals. Four power transformers T1, T2, T3 and T4 are shown connected to source/load element nodes through disconnect switches 2a–2d. The various levels of bus work and overhead cables for connection to other source/load elements are shown with designations similar to those of FIG. 5.

It should be noted that this station with sixteen elements comprised of twelve line positions and four transformer positions can be implemented with only eighteen circuit breakers whereas the prior art breaker and one-half embodiment for the same station would require twenty-four circuit breakers.

Figure 7A:
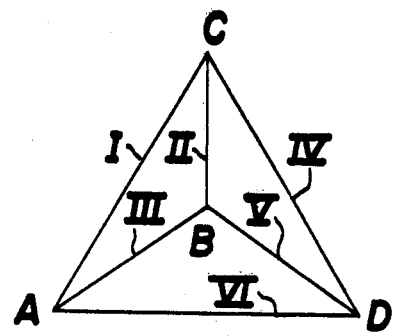
Figure 7B:
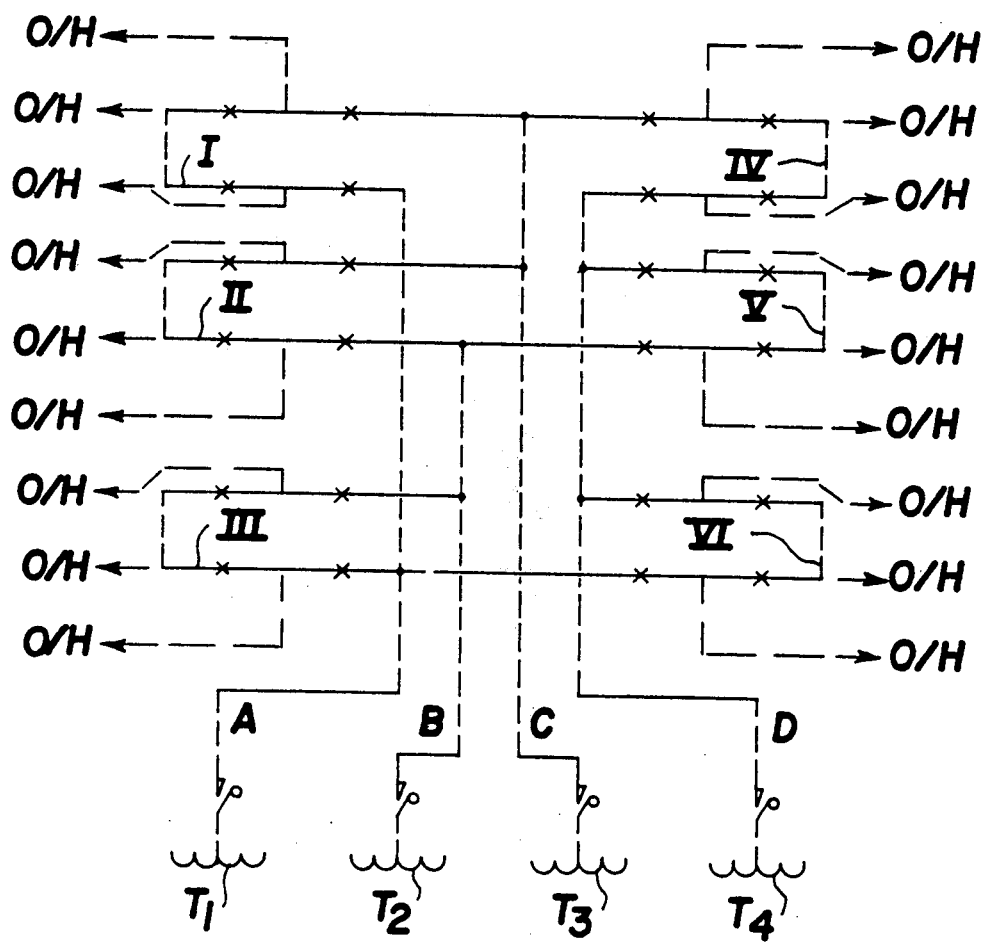

FIG. 7b illustrates a low-profile outdoor switchgear embodiment of the 4×6 network having four circuit breakers per branch. The scheme of branch connections to form the 4×6 network is illustrated in FIG. 7a. The corresponding branches of FIGS. 7a and 7b are referenced in corresponding Roman numerals.

It is to be emphasized that each branch of a 4×6 network need have, as a minimum, only one switching means. Hence, FIG. 7b can be modified to suit a particular application by omitting any or all but one of the circuit breakers from any of the branches, as required. Moreover, a simple re-orientation of selected branches can be made (for example, re-orient branches I and IV), to accommodate source/load lines on three sides of the switchyard.

To conserve land area, compressed gas insulated switchgear devices can be used in the present invention in which the spacing requirements for the conductors and elements are considerably reduced, particularly because the conductors are insulated and contained within gas-filled ducts which can be mounted together and cross over each other in much closer proximity than is possible for conventional open conductors. Such switchgear and ducts normally contain a compressed insulating gas such as sulphur hexafluoride.

The physical size of the compressed gas insulated switchgear apparatus and the spacing requirements for the transmission line positions are such that the circuit breakers can be located in straight line rows with a minimum of interconnecting bus duct work. Thus a double row of circuit breakers can be built for stations in which the transmission lines egress on both sides of the station, while a single row can accommodate all lines egressing out of the same side of the station as is illustrated, respectively, in FIGS. 8 and 9.

FIGS. 8b and 8c are single-line diagrams of the 4×6 network utilized in the aforementioned compressed gas insulated configuration. FIG. 8a shows a one circuit breaker per branch network as described earlier with reference to FIG. 3a and which, by comparison, will verify that FIGS. 8b and 8c are 4×6 networks. The nodes are referenced A, B, C and D, while the circuit breakers are shown by schematic representation but are unreferenced.

FIG. 8b shows the same one circuit breaker per branch network but representing the physical configuration of gas insulated circuit breakers and buswork with the elements similarly identified.

FIG. 8c shows the physical layout of a compressed gas insulated form of a two circuit breaker per branch 4×6 network with the nodes similarly identified as well as the circuit breakers by schematic symbol. Transformers T1, T2 and T3 are connected to nodes A, B and D. The arrows depict further source/load nodes to which transmission lines are connected. This system accommodates ten source/load nodes with twelve circuit breakers. This network is built in this figure with a double row of circuit breakers and buswork to match the transmission line egress outwardly on both sides of the station.

FIG. 9a shows the connection scheme of a basic network similar to that of FIG. 3b, and FIG. 9b shows a corresponding physical three circuit breaker per branch network in which the transmission lines all egress on the same side of a single row of gas insulated circuit breakers and buswork. The references are similar to those of FIG. 8.

It should be noted that the networks of FIGS. 8 and 9, as well as the ones previously described can be built up into more complex networks by adding circuit breakers or other like switchgear as described earlier. Networks can also be connected together at one or more nodes.

In the prior art distribution substations, the transmission or subtransmission voltage is stepped down to the distribution level by transformers whose secondary windings are connected to the customer load distribution feeders. Despite design refinements over the years, transformer failures still occur and there is a continuing need for inspection and maintenance procedures. Therefore, to ensure continuity of supply to customer loads, it is necessary to design transformer substations so that they can supply full maximum demand load output even when one transformer is out of service. For these reasons, a transformer substation having "m" equally rated transformers is said to have a "firm" rated output capacity equal to that of m−1 transformers.

Hence, for a two-transformer substation designed to serve a load rating designated "L", the firm output must come from 2−1=1 transformer and so each must have a rated capacity of L. The installed nameplate capacity at this substation is therefore 2L.

For the same firm rating, L, a four-transformer substation must supply the firm output from 4−1=3 transformers and so each must have a rated capacity of L/3. The installed capacity at this four-transformer substation would be 4(L/3)=1.33L.

The above examples illustrate the concept that total installed nameplate capacity (and hence cost) is reduced as the number of transformers is increased. Hence, for larger station ratings, it becomes economically preferable to install three or four smaller transformers instead of two larger ones even though the cost of additional space, foundations and interconnecting apparatus may be appreciable. Moreover, suppose that a station planner has decided that a particular station will have four transformers rated to serve a load which is forecasted to reach some designated level ten years hence. Initially, he may need only two of these transformers to carry the initial load and will add the third and fourth transformers, as required, to match the growth in load demand. In other words, a four-transformer plan affords a progressive building block approach to station design which matches area load growth more closely. Therefore, a significant portion of the ultimate capital outlay for equipment can be deferred. This is an important consideration in an era when financing costs are high.

In the prior art three and four transformer distribution substations, it is common practice to connect the secondary outputs into some form of ring bus to ensure continuity of supply to the connected feeder sections in the event of a transformer outage. The design of these rings must include consideration of two important factors, namely: the steady state current distribution within the ring and the fault current magnitude.

Even though connected feeder sections are arranged to draw equal loads from ring segments, the flow of current from each transformer does not necessarily divide equally in both directions around the ring. This can be illustrated with reference to prior art FIG. 1 wherein let it be assumed that a power source is connected to position 3A while all other positions (3B–3G) have connected loads which are identical. One might expect that the power for the load at 3E would flow in two equal portions from the source at 3A with one-half flowing through breaker 2A and thence to 3E and the other half flowing through breaker 2B and thence around the other half-ring path to 3E. However, the resistance of contacts within the serial breakers together with the resistance of bus joints within each half-ring path to 3E can be so much different that current division at 3A departs widely from the expected equal division. In fact, in low-impedance bus rings the distribution of current is generally unpredictable. Moreover, if the ring is opened for maintenance of circuit breaker 2A, for example, the current must all flow in one direction around the ring. Hence, the ring must be designed with a current rating which is adequate for this maximum asymmetry in current flow. Similarly, this maximum asymmetry in current flow can occur under fault conditions. Refer again to FIG. 1 and let it be assumed that source transformers are connected at 3A, 3D and 3F to feed power into the ring and also assume that breaker 2A is disconnected for maintenance. Now, if a fault occurs at 3G, the three transformers will feed power to the fault in one direction around the ring. Therefore, the ring segment between 3F and 3G must carry the fault current contribution of all three transformers. Since, at any given time, any one of the breakers 2A–2G could be disconnected for maintenance and since a fault can occur anywhere in the ring, it follows that the ring bus must be designed throughout with capacity adequate to carry the total fault current available from all connected power sources.

FIG. 10 illustrates the application of the 4×6 network to distribution systems to enable additional options in system design and in operating modes which will be discussed in the following paragraphs.

In FIG. 10a, the units designated S1, S2, S3 and S4 represent four input power sources which may, for example, be powerhouse generators, transmission lines, the generation units of an industrial co-generation utility group, a group of four generators in an aircraft or other mobile vehicle, or four distribution transformers.

In these distribution applications, each of the six branches of the 4×6 network have three circuit breakers (or other suitable switching means operating under any suitable manual, automatic, or mixed control) as denoted by the symbols "X" in FIG. 10a. Each source supplies power through three adjacent breakers to three associated load buses or feeders designated 1a, 1b, 1c; 2a, 2b, 2c; etc., and to which loads are connected as required. The dotted branch segments between 1a and 4a, 1b and 3b, 1c and 2c, etc., denote tie conductors which interconnect the load buses as shown to form the six branches of the 4×6 network.

Now let it be assumed that customer loads are connected to the load buses or feeders in such a pattern that the combined loads on each are approximately equal. Further, assume that the middle switching means (12, 13, 14, etc.) in each branch of the 4×6 network is open while all other switching means are closed.

The following results are to be noted. The entire network of FIG. 10a can be considered to be made up of four distribution subsystems, each having a single source and three radially oriented load buses or feeders. For example, source S1 has three connected buses or feeders 1a, 1b and 1c. The continuous load current in each radial branch segment is approximately one-third of the total power drawn from the single source. There can be no circulating currents because there are no closed rings. Current distribution among the branch segments is directly proportional to the distribution of loads among the buses. The maximum possible fault current on any branch segment is equal to the maximum fault current contribution of its connected single source. For example, with mid-branch switching means 12, 13 and 14 open, a fault on load bus 1a would be limited to the maximum fault current of S1 because there are no other connected sources.

If one of the four sources S1–S4 (FIG. 10a) is forced out of service, it can be isolated from the 4×6 network by opening the three switching means adjacent to it. The three associated radial branches can be resupplied from the surviving three sources by closing the middle switching means in the appropriate three branches. For example, if S1 is forced out of service, it is isolated by opening its three adjacent switching means which, of course, leaves branch segments 1a, 1b, 1c and all loads connected thereto without a power supply. They are resupplied by closing mid-branch switching means 12, 13 and 14. Branch segment 1a is now fed by S4, 1b is fed by S3 and 1c is fed by S2. This imposes an approximate one-third load increase on each of the surviving sources S2, S3 and S4.

If S1–S4 and all load segments described above were connected into a ring arrangement similar to that in FIG. 1 and if S1 were forced out of service and isolated from the ring, then S2, S3 and S4 would again suffer an approximate one-third load increase. However, the 4×6 network of FIG. 10a, when operated as described above, provides the advantage that there are no unpredictable current asymmetries to consider because there are no closed rings. Also, the continuous current and fault current carrying/interrupting requirements of all buses and switching means are dramatically reduced.

When operated in the manner described above, the arrangement of FIG. 10a can be considered to be comprised of four single-source distribution subsystems interconnected in such a way as to be mutually supportive of each other. For example, one such subsystem is comprised of the single source S1 with three switching means connected immediately adjacent to it, which switching means are also connected respectively to load buses 1a, 1b and 1c. The distribution subsystem also includes groups of loads (not shown) which are connected to and receive power from the load buses 1a, 1b and 1c. With the switching means 12, 13 and 14 in the open position, the subsystem described above operates independently since it is isolated from the rest of the network. If S1 goes out of service, load bus 1a is resupplied from S4 by closing switching means 14; 1b is resupplied from S3 by closing switching means 13; and 1c is resupplied from S2 by closing switching means 14. Therefore, the sources S2, S3 and S4 act in a supporting role to ensure continuity of power supply to 1c, 1b and 1a, respectively, if S1 is forced out of service.

Similarly, the overall network of FIG. 10a has three other subsystems, namely: S2 with load buses 2a, 2b and 2c which are isolated by open switching means 23, 24 and 12 respectively; S3 with load buses 3a, 3b and 3c which are isolated by open switching means 23, 13 and 34 respectively; and S4 with load buses 4a, 4b and 4c which are isolated by open switching means 14, 24 and 34 respectively. In a manner similar to that described above, S1, S3 and S4 act to ensure power to the loads of S2; S1, S2 and S4 act to ensure power to the loads of S3; and S1, S2 and S3 act to ensure power to the loads of S4. Hence, the four subsystems can be considered to be mutually supportive of each other.

The mid-branch connections shown dotted in FIG. 10a together with mid-branch switching means 12, 13, 14, 23, 24 and 34 provide a pre-arranged scheme for transfer of load segments if one source, S1, S2, S3 or S4, is forced out of service. Since continuity of supply to all loads is ensured, even with one source out of service, the network of FIG. 10a can be said to have a "firm" or ensured load capacity which is equal to the summed maximum capacity of the three sources which remain in service.

A limitation of the system of FIG. 10a is that transferred loads suffer a power interruption until completion of the switching transfer by the mid-branch switching means. However, if the system is operated under automatic control, this interruption will be very short-lived and hence quite acceptable for residential type loads. Systems for automatic control and protection of power utility systems and component apparatus have been well developed in the prior art and are readily adaptable to all of the networks included in this specification. See, for example, "Applied Protective Relaying", Copyright 1976, Library of Congress Card No. 76-8060, Chapters 6, 8, 9, 10, 13 and 18. Specifically, Chapter 13, Section IV of this book covers the transfer of loads following a source failure as discussed above with reference to FIG. 10a.

Some loads are so sensitive that they can not tolerate even the shortlived interruptions which may occur during an automatic switching transfer. Such loads are classified as "uninterruptable" and can be accommodated by a simple modification as follows: In FIG. 10a suppose that the middle branch switching means 12 between load buses 1c and 2c is closed in addition to the three radial switching means adjacent to each of S1 and S2. The branch containing 1c, 12 and 2c now has assured continuity of supply if a single contingency forces S1 or S2 out of service and so the uninterruptable loads can be connected to this branch. However, the fault duty on segments 1a, 1b, 2a and 2b will be approximately double that existing when the mid-branch switching means 12 between 1c and 2c is left open. Similarly, the mid-branch switching means 34 between 4c and 3c can be closed, if required, to serve another group of uninterruptable loads.

The advantages and characteristics of the 4×6 network for distribution applications provide an opportunity for advantageous interconnection of existing substations. Consider two distribution substations located in adjacent suburban districts, each having two supply transformers and all four of near-equal rating. Interconnection of these two substations into a 4×6 network increases the "firm" or ensured output capacity to that of three transformers—a 50% increase but with no increase in installed transformer nameplate capacity.

The four single-source distribution subsystems within the 4×6 network of FIG. 10a provide an opportunity for a modular approach to the design of mini-substations. Such single-source modules are integrated into the structure of high-rise buildings at four appropriate locations within an urban area of high population density.

This is illustrated in FIG. 12 wherein FIG. 10a has been redrawn and superimposed upon a map representing an urban area of high population density.

In this case, four separate modules containing the sources S1 to S4, each with its associated circuit breakers and buswork, are located within buildings #1 to #4 as shown and the six branches have the same reference numbers as FIG. 10a. The portions of the branches shown by dashed lines, which interconnect these modules to form the 4×6 network operate as primary feeders running underground along the streets and avenues, as shown.

Each of the sources S1 to S4 includes a power transformer and associated high voltage switchgear which are energized from a high voltage subtransmission line (not shown). These transformers step the voltage down to the required primary feeder voltage level.

The previous analysis illustrates the reduction in transformer size when four transformers are used to supply a given load, instead of three or two transformers. Also, the size of typical primary feeder switchgear is small, especially if implemented in a relatively compact form available with compressed gas insulation. Therefore, the four dispersed modules are each conveniently contained within a portion of the basement or ground floor area of the large urban buildings #1 to #4 as portrayed in FIG. 12.

As demonstrated previously in the discussion of FIG. 10a, the four modules of FIG. 12 operate independently when the mid-branch breakers (12, 13, 14, 23, 24 and 34) in the 4×6 network are electrically open (i.e. tripped). These open breakers are distinguished in FIG. 12 as encircled X's for clarity and as noted in the legend thereon.

In this mode of operation, the four independent modules and their associated primary distribution feeders function as follows: Source S1 supplies power to three feeders, namely: feeder bus 1a and feeder 1a terminating at open breaker 14 at the end of feeder bus 4a in building #4; feeder bus 1b, isolated from feeder 3b by open breaker 13, connected to the feeder 1b running North on Avenue A; and feeder bus 1c, isolated from feeder 2c by open breaker 12, supplying power to feeder 1c carrying loads within buiding #1.

Source S2 supplies power to three feeders, namely: feeder bus 2c and feeder 2c terminating at open breaker 12 at the end of feeder bus 1c in building #1; feeder bus 2b, isolated from feeder 4b by open breaker 24, connected to the feeder 2b running North on Avenue F; and feeder bus 2a, isolated from feeder 3a by open breaker 23, supplying power to feeder 2a carrying loads within building #2.

Source S3 supplies power to three feeders, namely: feeder bus 3a and feeder 3a terminating at open breaker 23 at the end of feeder bus 2a in building #2; feeder bus 3b and feeder 3b terminating at open breaker 13 at the end of feeder bus 1b in building #1; and feeder bus 3c isolated from feeder 4c by open breaker 34, supplying power to feeder 3c carrying loads within building #3.

Source S4 supplies power to three feeders, namely: feeder bus 4c and feeder 4c terminating at open breaker 34 at the end of feeder bus 3c in building #3; feeder bus 4b and feeder 4b terminating at open breaker 24 at the end of feeder bus 2b in building #2; and feeder bus 4a, isolated from feeder 1a by open breaker 14, supplying power to feeder 4a carrying loads within building #4.

Thus, the system of FIG. 12 operates as if there are four independent modular substations, each supplying power to three primary feeders. This pattern is repeated as required throughout a given distribution area.

Now, suppose that source S1 is forced out of service and must be isolated for repairs. Source S1 is isolated from the 4×6 network by opening its adjacent three breakers (previously closed) in building #1. This, of course, leaves the three associated primary feeders without power. They can be re-supplied by closing the two previously-open breakers 12 and 13 in building #1 and the previously-open breaker 14 in building #4. Examination of the network reveals that these three feeders are now re-connected, one to each of the modules in buildings #2, #3 and #4 so that the impact of the source S1 outage is minimized by distributing its former loads among the three surviving sources S2–S4. Also, an examination of the network shows that a similar isolation and re-supply switching operation occurs if any other one of the sources S2, S3 or S4 is forced out of service instead of source S1.

It is to be noted that the six feeders arranged to form the six branches of the 4×6 network in FIG. 12 actually have a double function. That is, they act as primary feeders and also serve as inter-modular ties to facilitate a re-supply of loads following the outage of any single module in building #1, #2, #3 or #4.

For co-generation or other multi-source distribution systems, the number of sources need not be limited to four. The 4×6 network can be expanded by adding triple-connected nodes, in pairs as required, to accommodate any even number of sources with networks having "Q" triple-connected nodes and $3Q/2 = 1.5Q$ branches (where $Q=4, 6, 8$, etc.). Thus, with reference respectively to the numbers of triple-connected nodes and resultant branches, one could refer to these available forms as 4×6, 6×9, 8×12, 10×15, etc., networks. In such networks, an outage of one source can be accommodated by a transfer of its three load segments to three other surviving sources.

The elements 1a, 1b, 1c; 2a, 2b, 2c; etc., in FIG. 10a may be the main buses in a high-capacity distribution feeder building; distribution mains in one or more high-rise buildings; single feeders in a rural distribution system; etc., as required for a particular application. Also, it is to be emphasized that FIG. 10a is a single-line schematic representation. The spatial orientation of these power distributing elements and interconnectons can be varied as required to suit the physical or geographic constraints of the application. For example, FIG. 10b is a re-arrangement of FIG. 10a which may be representative of the geographic orientation of single distribution feeders along road allowances to serve a rural area. In this case, the sources S1, S2, etc., are distribution transformers which have single phase or polyphase output windings, as required, and the six branches of the 4×6 network are built with two, three or four wire feeder construction, as required to match the type of output winding.

Alternatively, FIG. 12 may represent a suitable arrangement for a rural distribution system by re-defining the streets and avenues as rural roads and by visualizing the buildings as perimeter fences around appropriately-sized outdoor substation modules.

Also, a modified or hybrid arrangement is where the four distribution transformers have Y-connected three phase output windings while the six branches are built and operate as single phase feeders, as illustrated in FIG. 10c. In this case, the four triple-connected nodes of the 4×6 network are provided by the neutral points N1, N2, N3 and N4 within the secondary windings of each of the four transformers and the output phase terminals are connected, one to each of the three single-phase network branches emanating therefrom, as shown in FIG. 10c. In the event of a single transformer outage, its three single-phase loads are transferred, each to a corresponding phase of the surviving transformers. If the network is carrying full firm load, each surviving transformer is loaded to its maximum capacity. However, each transformer has a phase unbalance which requires the transformers to be installed at a somewhat higher nameplate rating to avoid excessive hot-spot winding temperatures. Nevertheless, this hybrid arrangement is economically advantageous during the initial development stages of a rural distribution system due to savings in conductors and in single phase switchgear. The full set of three phase conductors with three phase switchgear may be built later in each of the six network branches when system load growth justifies the added cost.

The modified or hybrid form of the 4×6 network is also applicable to substation layouts as will be illustrated in the following example. Consider a group of four transformers in a transformer station connected to supply power to four load elements. In a typical application, these four load elements may take the form of subtransmission lines leaving the station or may be built as four main load buses carrying power from the transformers to sections of distribution feeders. FIG. 11a illustrates the equipment layout for a conventional prior art 1½ CB switchgear system. FIG. 11a presents the circuit in full three phase representation instead of the usual single-line denotation, to facilitate a comparison with and thereby reveal the equipment economies of the equivalent hybrid 4×6 network implementation portrayed in FIG. 11b. The labels "a", "b", and "c" in FIGS. 11a and 11b are used in accordance with industry standard designations for the individual phases of the bus conductors and transformers in a three phase system. The 1½ CB scheme of FIG. 11a requires twelve CB's, each of a three pole design, for construction of this layout. In switching capability, these twelve CB's are equivalent to $12 \times 3 = 36$ circuit breakers of a single-pole design.

The modified or hybrid 4×6 network implementation equivalent to FIG. 11a is illustrated in FIG. 11b. In this case, each of the usual four triple-connected nodes of the 4×6 network is replaced by the three phase terminals a, b, and c of one of the four source transformers T1–T4. The six branches of the 4×6 network are connected, one each, between correspondingly designated pairs of transformer phase terminals and hence each branch is connected for operation at single phase. For example, one such branch in FIG. 11b includes segments 12a and 21a connected between the "a"-phase terminals of transformers T1 and T2. Another branch includes segments 34a and 43a connected between the "a"-phase terminals of transformers T3 and T4. These branches of the 4×6 network are referred to as the "a"-phase branches. Similarly, FIG. 11b has two "b"- phase branches; one with segments 13b and 31b connected between the "b"-phase terminals of transformers T1 and T3 and another with segments 24b and 42b connected between the "b"-phase terminals of transformers T2 and T4. Also, two "c"-phase branches are shown in FIG. 11b; one with segments 14c and 41c connected between the "c"-phase terminals of transformers T1 and T4 and another with segments 23c and 32c connected between the "c" -phase terminals of transformers T2 and T3. Thus, this connection scheme results in the formation of two "a"-phase branches, two "b"-phase branches and two "c"-phase branches to complete the six branches of the hybrid 4×6 network of FIG. 11b.

Within each of the six branches described above, two conductors are arranged in parallel, as shown, to form a single phase ring interconnecting corresponding pairs of transformer phase terminals and corresponding pairs of phase terminals of two load elements. For example, in the upper "a"-phase branch of FIG. 11b, segment 12a is connected to the "a"-phase terminal of load L1 and its right end connects through a breaker to junction 2a which also connects to the "a"-phase terminal of T2. Junction 2a is also connected through a breaker to the right end of segment 21a which also connects to the "a"-phase terminal of load L2. The left end of segment 21a connects through a breaker to junction 1a which also connects to the "a"-phase terminal of T1. Junction 1a also connects through a breaker to the left end of segment 12a which completes the ring path. There are six such complete ring paths, one in each of the six branches of FIG. 11b. This ring arrangement within each branch permits the opening of a CB for maintenance or the tripping of a pair of CB's to isolate a faulted load element phase while still retaining the double-redundant transformer supply to the remaining connected phase load.

A careful examination of the ring paths in FIG. 11b as described above reveals that each of the six single phase branches includes two separate load element phase terminals supplied by two separate source element phase terminals connected into a simple ring arrangement. Each single load element phase has a source element phase connected on each side of it within the ring and so this doubly-redundant supply connection is very secure. For example, the "a"-phase of load L1 is supplied by the "a"-phase of T1 and by the "a"-phase of T2.

The load element phase conductors are re-arranged into three-phase groups designated L1, L2, L3 and L4 to provide three-phase output connections to load lines or buses as shown in FIG. 11b. Thus, in the hybrid embodiment of the 4×6 network, source and load connections are made to polyphase elements whereas the six internal branches of the network are embodied in single-phase construction and this accounts for the "hybrid" designation for this composite arrangement of polyphase and single phase construction.

It is to be noted that FIG. 11b requires only twenty-four single-pole CB's whereas FIG. 11a requires the equivalent of thirty-six. In other words, the hybrid 4×6 scheme shown in FIG. 11b has a requirement for switchgear which is ⅓ less than that of the prior art 1½CB scheme of FIG. 11a.

Moreover, since each single phase branch of FIG. 11b has a connection to only two transformer phase terminals, the fault level will be one-half of that for the prior art 1½ CB scheme of FIG. 11a. Hence, in addition to the ⅓ saving in switchgear quantities there is also an approximate 50% reduction in the fault duty requirements for switchgear and buswork in the hybrid 4×6 network arrangement.

As stated previously, transformers are rated to carry the full station load demand with one transformer out of service. Therefore, if the station represented by FIG. 11b is operated at full firm load with all four transformers in service, each will be operating at ¾ of its rated load. Now assume that transformer T1 is forced out of service so that the "a" phases of loads L1 and L2 are supplied only by the "a" phase of transformer T2. Hence, the load on the "a" phase of transformer T2 increases to 2×0.75=1.5 or 150% of rated load. Phases "b" and "c" of transformer T2 are unaffected by the outage of transformer T1 and remain at 0.75 or 75% of rated load. Therefore, the average phase load on transformer T2 is (1.5+2×0.75)/3=1.0 or 100% of rated load. This illustrates that transformer T2 is not overloaded in its total rating but the 150% load on phase "a" is of concern and could cause excessive heating in the "a"-phase windings if this situation is allowed to persist. Similarly, phase "b" of transformer T3 and phase "c" of transformer T4 become 150% loaded due to the outage of transformer T1.

To overcome this limitation of the hybrid 4×6 network, two alternatives are possible. First, somewhat oversize transformers T1-T4 may be installed in anticipation of possible phase unbalanced overload during an outage of one of them. Second, load-equalizing circuit breakers may be installed between corresponding pairs of single phase internal branches within the network. This installation requires three single-pole circuit breakers 5-7 (or one three-pole breaker) connected into the hybrid 4×6 network as shown in dashed lines in FIG. 11b. Closure of circuit breakers 5-7 provides conductive paths between the previously separated pairs of "a", "b" and "c" single phase branch rings and thereby restores equal sharing of the station load by the three surviving transformers. To illustrate this, recall the previous discussion which demonstrates that an outage of transformer T1 in FIG. 11b results in 150% overload on phase "a" of transformer T2, phase "b" of transformer T3, and phase "c" of transformer T4. Closure of circuit breaker 5 provides a conductive path between the "a"-phase rings at the top and bottom of FIG. 11b through the conductors (shown in dashed lines) connected at junctions 2a and 4a. Hence, phase "a" of transformer T2 is now connected to phase "a" of transformers T3 and T4 and the four phase "a" terminals of loads L1-L4 are also connected to the same conductive path. This connection enables the phase "a" windings of surviving transformers T2-T4 to share equally the total station phase "a" demand of loads L1-L4. Similarly, closure of circuit breaker 6 enables the phase "b" windings of surviving transformers T2-T4 to share equally the total station phase "b" demand of loads L1-L4 while closure of circuit breaker 7 enables the phase "c" windings of surviving transformers T2-T4 to share equally the total station phase "c" demand of loads L1-L4. Thus, when any single transformer T1-T4 is forced out of service, the operator can open its isolating disconnect switch and then close the load-equalizing circuit breakers 5-7 to restore balanced loading on all phases of the surviving transformers.

It should be noted that an operation with the load-equalizing CB's 5-7 closed results in increasing the fault level to the total fault contribution of the three surviving transformers. Hence, when operation with the full set of four transformers T1–T4 is restored, the load-equalizing CB's 5–7 should be opened again to separate the single phase branches within the hybrid network and thereby reduce the fault level to the fault contribution of only two transformers, as explained previously.

On many occasions, a closure of the load-equalizing CB's is not necessary for the following reasons. Transformers are initially installed with extra capacity in anticipation of area load growth. Even when load growth approaches the station rated capacity, the load during off-peak seasons is considerably reduced. Therefore, it is only necessary to close the load-equalizing CB's 5–7 following a transformer outage at a time when load growth has approached station capacity and the peak load period is in effect. Hence, on a probability basis, the requirement for load-equalization switching will be an infrequent limitation.

FIG. 3 has four different but electrically equivalent portrayals of the 4×6 network which illustrates how the six branches are arranged so that they interconnect to form four triple connected nodes. These fugures do not necessarily represent either the physical arrangement or the orientation of the actual branches. In fact, for conventional outdoor switchgear, it is customary to arrange the equipment and buswork in the general shape of a rectangular array within the switchyard in order to provide adequate electrical clearance between equipment and network branches and to provide access driveways through the array for maintenance vehicles. FIGS. 5, 6, 7, 10 and 12 are illustrative of such rectangular arrangements.

FIGS. 13, 14 and 15 include illustrations of how additional rectangular arrangements can be derived by a logical process of successively reshaping the schematic forms of FIGS. 3a and 3b. This reshaping results in a set of basic or generic rectangular forms from which an arrangement can be chosen to suit the particular geometric constraints of a specified application. Each of these available forms may be more or less suitable for a particular application according to whether the network specifications requires two, three, or four circuit breakers, per branch.

Figures 13A, 13B:
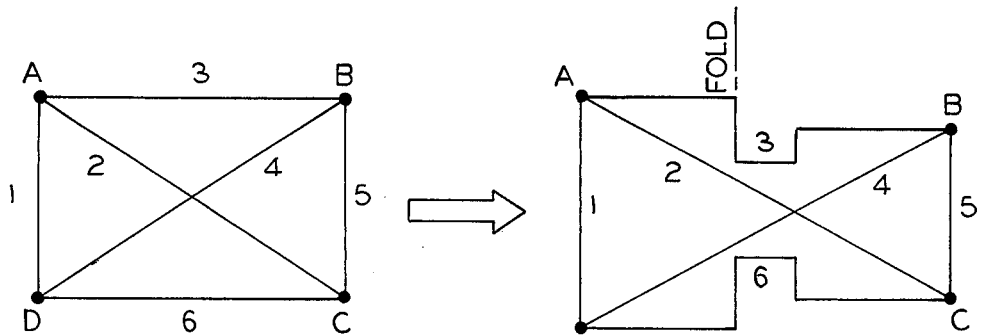
Figures 13C, 13D:
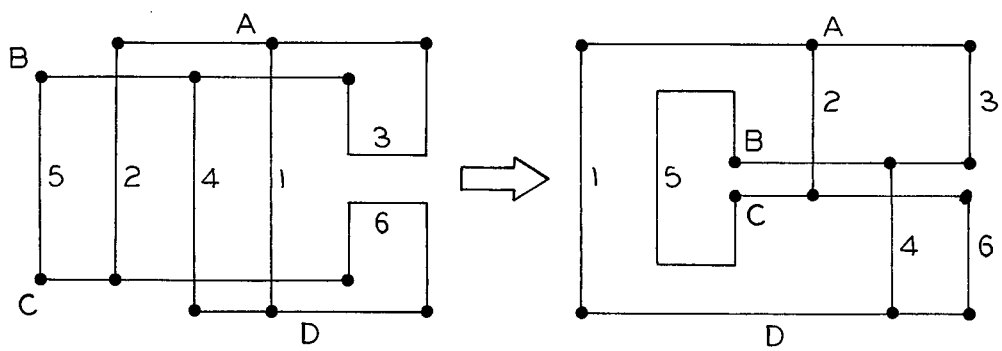
Figures 13E, 13F:
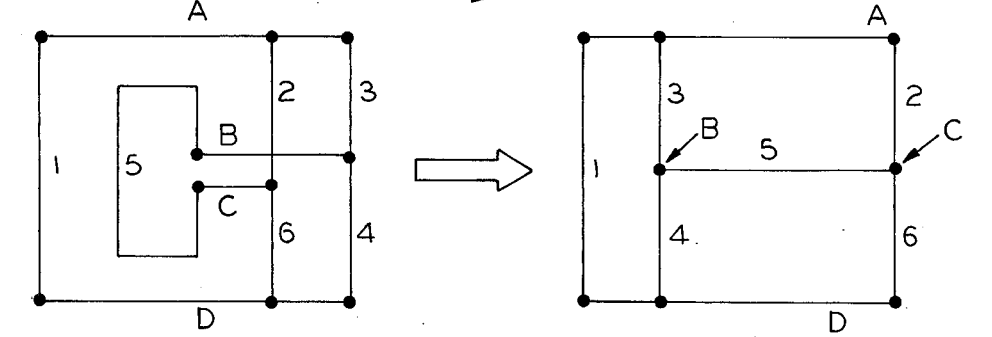

Thus, for example, FIGS. 13a and 13b illustrate the derivation of the switchyard arrangement, FIG. 13c, which was used in FIG. 6, with three circuit breakers per branch. FIGS. 13d and 13e show successive logical steps leading to the arrangement of FIG. 13f. When turned clockwise through 90°, the arrangement of FIG. 13f is similar to the arrangement of FIG. 5b. By making a direct comparison of the triple-connected nodes and numbered branches, FIG. 13h can be recognized as the rectangular equivalent to FIG. 13g. The arrangement in FIG. 13h can be substituted for a breaker and one-half prior art arrangement if branches four, five and six are constructed with three circuit breakers per branch, branches two and three with two circuit breakers each and branch one with four circuit breakers, as shown.

Figure 14A:
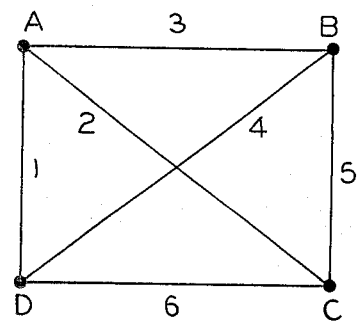
Figure 14B:
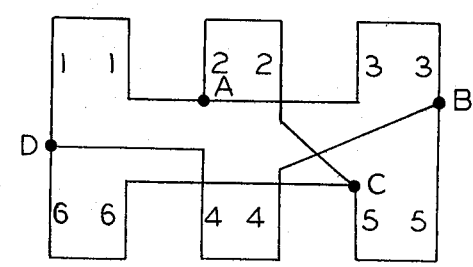
Figure 14C:
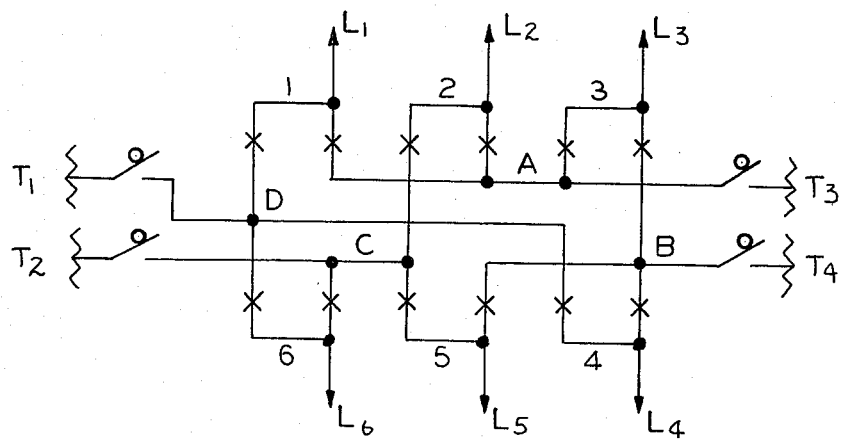
Figure 14D:
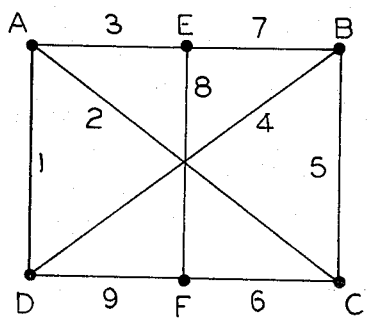
Figure 14E:
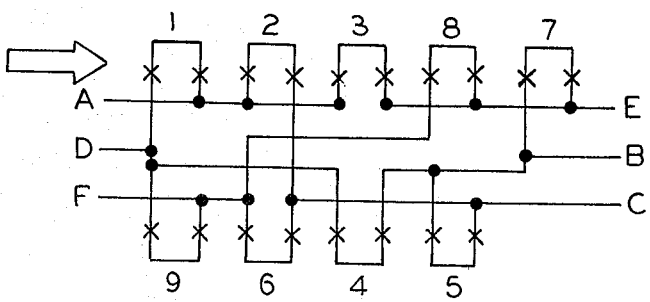

FIGS. 14a and 14b illustrate the logical derivation of FIG. 14c which is similar to FIG. 7. FIG. 14c, having two circuit breakers per branch, can be constructed with only two levels of conductors to facilitate conductive crossovers and could be illustrative of an extra high voltage switchyard connected to six transmission lines L1–L6 operating at 735 KV and feeding power to 500 KV and 230 KV sub-systems through 500 KV step down transformers T3 and T4. FIG. 14c is a 4×6 switching network. To accommodate more transmission lines or transformers, a 6×9 switching network may be built. This is illustrated schematically in FIG. 14d with the corresponding rectangular arrangement at FIG. 14e.

Figure 14F:
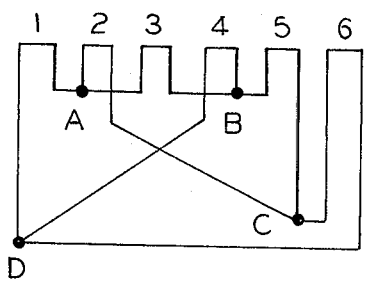

FIG. 14b is obtained by reshaping FIG. 14a as a logical step in the derivation of FIG. 14c wherein the transmission lines egress on both sides of the switchyard. If the transmission lines must all egress on the same side of the switchyard, FIG. 14a can be reshaped as shown in FIG. 14f which leads logically to the rectangular arrangement in FIG. 14g.

Figure 14G:
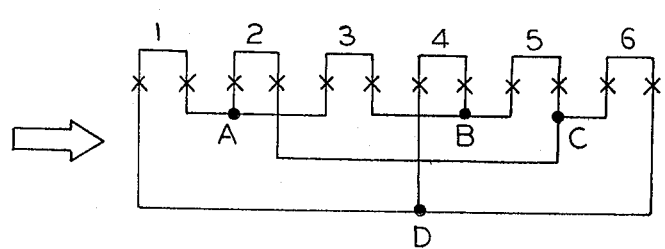
Figure 15A:
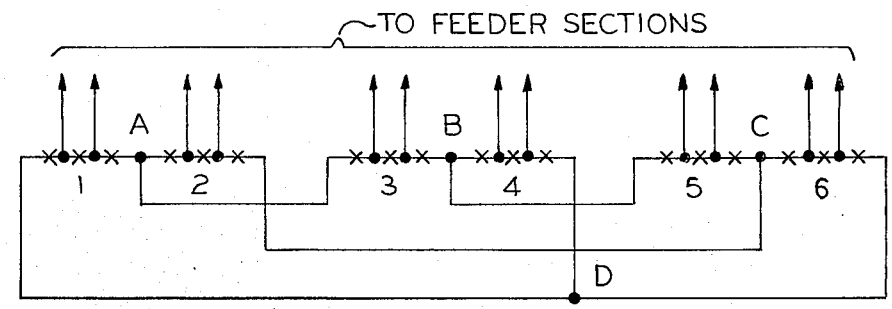

FIG. 14g can be equipped with three circuit breakers per branch and reshaped further to derive the arrangement shown in FIG. 15a. This arrangement is useful to facilitate the assembly of circuit breakers and interconnecting buswork into compact modular groups at high capacity distribution feeder building installations.

Recall the discussion of power distribution which is presented above with reference to FIG. 10 and assume that four identical supply transformers are electrically connected to nodes A, B, C and D in FIG. 15a. If all mid-branch circuit breakers are open, it is believed clear that the six pairs of connections, identified as going to the feeder sections, are pairs of independent main power supplies. Thus, in branch #1, one feeder section connection is energized from the transformer connected to Point A while the other feeder section connection is independently supplied from the transformer connected to Point D. The feeder section supply pairs can be connected by additional buswork or cables to conventional prior art feeder sections which are arranged to supply power to groups of distribution feeders, via two independently energized main buses.

Figures 13G, 13H:
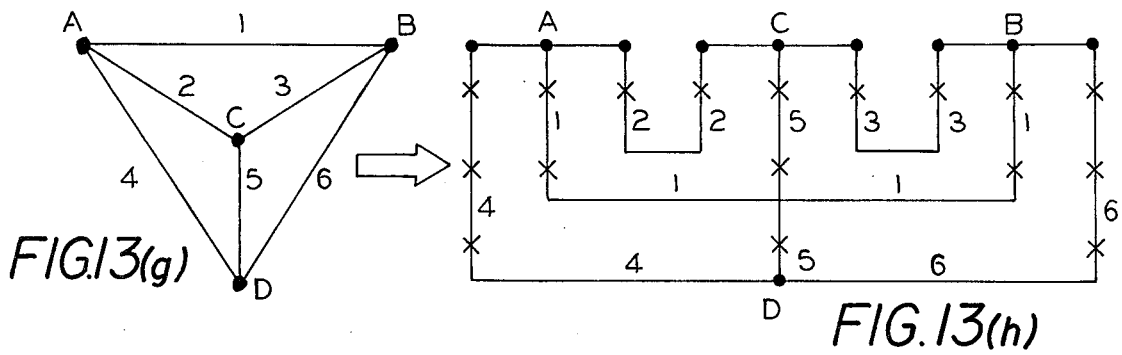
Figure 15B:
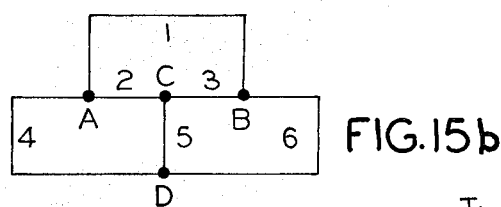
Figure 15C:
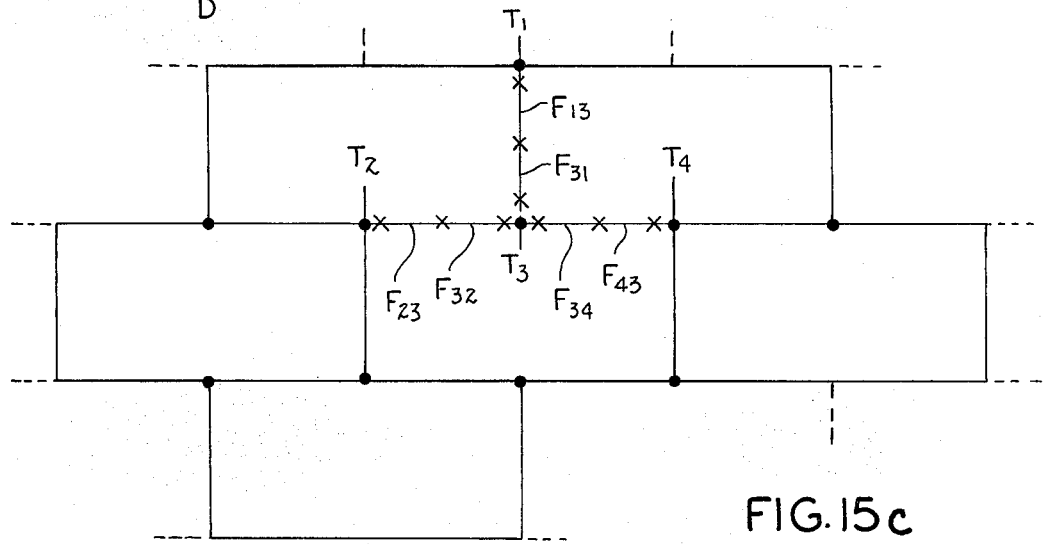

The schematic representation of the 4×6 network shown in FIG. 13g can be redrawn in the rectangular arrangement shown in FIG. 15b. This FIG. 15b arrangement is somewhat suggestive of the arrangement of individual bricks in a brick wall. Hence, it is believed clear that the network can be expanded in any direction as illustrated in FIG. 15c to form a network having "Q" triple connected nodes and 1.5Q branches (where Q=4, 6, 8, etc.). Thus, FIG. 15c is an exemplary rectangular network arrangement having ten triple-connected nodes and fifteen branches.

Additional nodes can be added in pairs together with inter-connecting branches at locations suggested by the dashed lines. The network of FIG. 15c can be extended over a geographic region of any required size to function as a network of primary distribution feeders. Distribution supply transformers of identical rating are connected to each triple connected node. Four such distribution transformers, T1–T4, are shown for illustrative purposes in FIG. 15c together with the associated switching means in the branches between them. The supply transformers, feeder branches and associated switching means function as explained in the discussion with reference to FIGS. 10a, 10b and 10c. Thus, with the mid-branch switching means open, primary feeders F31, F32 and F34 are energized from transformer T3.

Also, transformers T1, T2 and T4 are mutually supportive of transformer T3. That is, the transformer connected to any node is backed up by its three nearest neighboring transformers, in a manner which is quite similar to that explained above with reference to FIG. 10.

FIG. 15c has been drawn with uniform mesh size for illustrative convenience. However, the size of individual loops or meshes can be varied in both area and orientation to suit the variations in load density and the load location within the distribution region. For example, in a rural district, the two halves of each branch (separated by the open mid-branch switching means) function as rural primary feeders which might each be several miles long. Alternatively, within an area of higher population density, where load demand density is greater, the mesh size can be reduced as required so that the half-branch feeders may be only a few blocks in length. It is to be noted that this increases the density of triple-connected nodes and hence the density of supply transformers. Therefore, a larger amount of transformer capacity is available in regions of higher load density, without the necessity of increasing the size of individual transformers and thereby destroying the mutually supportive capability of equally rated transformers.

Figure 15D:
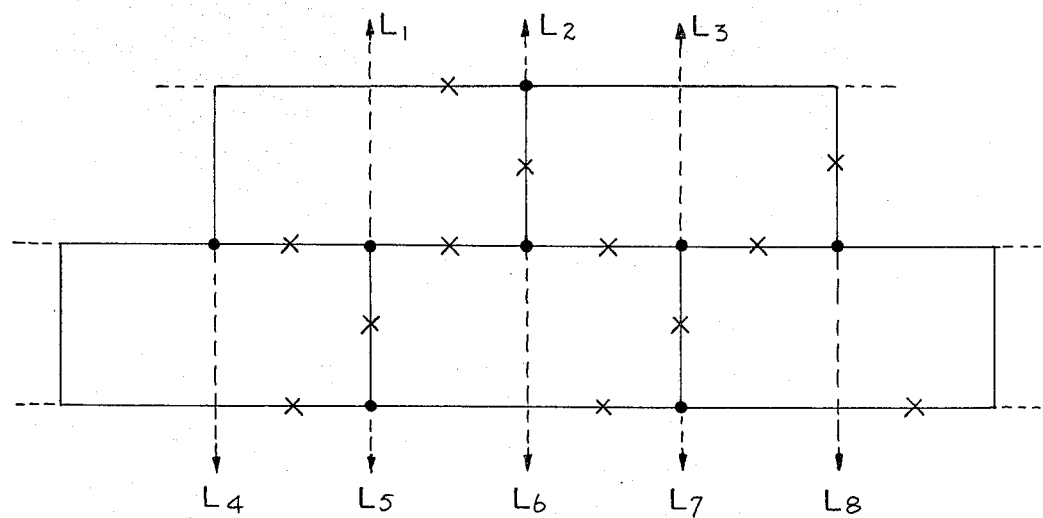

The arrangement of FIG. 15b can be expanded by adding additional triple-connected nodes on the left and right sides to yield the network in FIG. 15d. This exemplary network has eight triple-connected nodes and twelve branches containing a single circuit breaker each. The twelve circuit breakers control eight line/load positions, L1-L8, and so their ratio is 12:8=1½:1. Hence, this switching network is equivalent in breaker usage to the prior art breaker and one-half configurations. However, the system of FIG. 15d is much more secure than the prior art systems since each node is connected into the network through triple redundant conductive paths. The limitations of double bus systems are eliminated and back-up switching is provided for a failed breaker which requires back-up tripping of only two others, This network can be built with only two levels of buswork and can be extened further to the left and right, as indicated, to accommodate additional line/load positions.

The 4×6 network can be used with either D.C. or A.C. (polyphase or single phase) at any voltage. Rather than being restricted to use in switchyards, electric utility power distribution systems, and the other applications as described herein, it is also usefully employed at location where there is a multiplicity of loads, such as in electric furnace industrial applications, with electrolytic loads, aluminum potlines, electric lighting systems, etc. Wherever windings of transformers are connected to the various nodes in a 4×6 network, the other windings thereof can be connected to a network constructed according to similar principles as this invention, or to a network constructed according to the prior art.

The present invention thus achieves a considerable reduction in the cost of power switching systems apparatus through a reduction in the number of switching means, source capacities and ratings of apparatus and buswork items; increased security of power delivery to connected loads; additional options in the design and planning of growth stages for power delivery systems; and a wider choice of system operating modes.

Other structures falling within the same principles may now be conceived by someone understanding this invention and such are considered to be within the scope of this invention as defined by the appended claims.

The embodiments of the invention in which an exclusive property or privilege is claimed are defined as follows:

1. A distributed switching network comprising a plurality of remotely located sources/loads, six conducting branches extending between said remotely located sources/loads, each of said branches of said switching network comprising means for conducting direct current, single phase alternating current or polyphase alternating current as required by the application thereof, each of said branches containing at least one switching means, said branches being connected at their ends to form four 3-sided rings, each of said branches forming one side of and being shared by two of the said rings, whereby four triple-connected nodes are formed at the end connction points of the said branches, each of said nodes enabling a connection of one of said remote sources/loads and each of said nodes being isolatable from all of the other said nodes by an opening of a maximum of three of said switching means, including an additional switching means in at least one of the said branches to provide a double-connected source/load connection point or a node between the said additional switching means and said one switching means in said one branch, the said double-connected point being isolatable from the remainder of said network by an opening of the said additional switching means and said one switching means in said one branch.

2. The distributed switching network as defined in claim 1, including additional switching means connected in series in each of said branches, whereby additional double-connected source/load connection points or nodes are provided between pairs of said switching means and wherein said nodes are isolatable from the remainder of said network by an opening of appropriate pairs of said switching means.

3. The distributed switching network as defined in claim 2 in which there are "n" source/load connection points or nodes, and "N" switching means, where N = n + 2 and is equal to or greater than 4.

4. The distributed switching network as defined in claim 3 in which N/n is between 1½ and 1.

5. A distributed switching network comprising a plurality of remotely located sources/loads, six conduction branches extending between said remotely located sources/loads, each of said branches containing at least one switching means, one switching means in one or more of said branches being normally operated in the electrically open position, there being "n" source/load connection points or nodes, and "N" switching means, where N=n+2 and n is equal to or greater than 4, the said branches being connected at their ends to form four 3-sided rings, each of said branches forming one side of and being shared by two of the said rings, whereby four triple-connected nodes are formed at the end connection points of the said branches, each of said nodes enabling a connection of one of said remote sources/loads and each of said nodes being isolatable from all of the other said nodes by an opening of a maximum of three of said switching means, including additional switching means connected in series in each of said branches, whereby additional double-connected source/load connection points or nodes are provided between pairs of said switching means and wherein said nodes are isolatable from the remainder of said network by an opening of appropriate pairs of said switching means.

6. The distributed switching network as defined in claim 5 in which one or more subsystems are electrically isolated from the rest of the network, each of said subsystems being comprised of a single triple-connected node and three branch segments between the said node and the said open switching means.

7. The distributed switching network as defined in claim 5 in which one or more subsystems are electrically isolated from the rest of the network, each of the said subsystems being comprised of two triple-connected nodes which are electrically connected by a single conductive branch and four branch segments between the said nodes and the said open switching means.

8. The distributed switching network as defined in claim 5 wherein re-distribution of power supply to the said branch segments is accomplished by pre-arranged operation of the said switching means.

9. The distributed switching network as defined in claim 5 wherein the triple-connected nodes are each coincident with and formed by the neutral point within the Y-connected windings of a transformer and wherein the said branches of the said network are constructed for operation at single-phase and connected, one each, to the phase terminals of the said transformers.

10. The distributed switching network as defined in claim 6, wherein re-distribution of power supply to the said branch segments is accomplished by a pre-arranged operation of the said switching means.

11. The distributed switching network as defined in claim 6 wherein the triple-connected nodes are each coincident with and formed by a neutral point within the Y-connected windings of a transformer and wherein said branches of said network are constructed for operation at single-phase and connected, one each, to the phase terminals or said transformers.

12. The distributed switching network as defined in claim 7, wherein re-distribution of a power supply to said branch segments is accomplished by a pre-arranged operation of the said switching means.

13. The distributed switching network as defined in claim 7 wherein the triple-connected nodes are each coincident with and formed by a neutral point within the Y-connected windings of a transformer and wherein said branches of said network are constructed for operation at single-phase and connected, one each, to the phase terminals of said transformers.

14. A distributed switching network comprising a plurality of remotely located sources/loads, six conducting branches extending between said remotely located sources/loads, each of said branches containing at least one switching means, said branches being connected at their ends to form four 3-sided rings, each of said brances forming one side of and being shared by two of said rings, whereby four triple-connected nodes are formed at the end connection points of said branches, each of said nodes enabling a connection of one of said remote sources/loads and each said node being isolatable from all of the other said nodes by an opening of a maximum of three of said switching means, additional triple-connected nodes being added in pairs, to form expanded networks having any desired even number, "Q", of triple-connected nodes and 1.5Q branches, where Q=4, 6, 8, etc.

15. The distributed switching network as defined in claim 14, expanded to provide a power distribution network throughout a given geographic area with "Q" power distribution transformers of equal capacity connected, one each, to the said triple-connected nodes and with three switching means in each of the 1.5Q branches serially located at the two ends and the midpoint of each of said branches, and means for operating all of said mid-branch switching means in an electrically open position to form "Q" single source transformer substations each supplying three distribution feeders in a mutually supportive manner whereby an outage of one transformer is accomodated by a closure of the mid-branch switching means on the three affected feeders to resupply them from the three supporting neighbor transformers.

16. The distributed switching network as defined in claim 14, expanded to provide a power distribution network throughout a given geographic area with "Q" power distribution transformers of equal capacity connected, one each, to said triple-connected nodes and with three switching means in each of the 1.5Q branches serially located at the two ends and the midpoint of each of said branches, and means for operating selected one of said mid-brach switching means in an electrically closed position in order to provide a double redundant power supply to selected branch loads.

17. The distributed switching network as defined in claim 14, expanded to provide a power distribution network throughout a given geographic area with "Q" power distribution transformers of equal capacity connected, one each, to said triple-connected nodes and with three switching means in each of the 1.5Q branches serially located at the two ends and the midpoint of each of said branches, and means for operating all of said mid-branch switching means in an electrically closed position in order to provide a double redundant power supply to all branch loads.

18. The distributed switching network as defined in claim 14 expanded to provide a rectangular switching array which matches the number, physical spacing, and orientation of the required line/load termination connections and which is further arranged for construction with buswork conductors set at two or three different height levels to facilitate conductive crossovers.

19. The distributed switching network as defined in claim 14 including an additional switching means in at least one of said branches to provide a double-connected source/load connection point or node between said additional switching means and said one switching means in said one branch, said double-connected point being isolatable from the remainder of said network by an opening of said additional switching means and said one switching means in said one branch.

20. The distributed switching network as defined in claim 14, including additional switching means connected in series in each of said branches, whereby additional double-connected source/load connection points or nodes are provided between pairs of said switching means and wherein said nodes are isolatable from the remainder of said network by an opening of appropriate pairs of said switching means.

21. A distributed switching network comprising a plurality of remotely located sources/loads, six conducting branches extending between said remotely located sources/loads, each of said branches containing at least one switching means, said branches being connected at their ends to form four 3-sided rings, each of said branches forming one side of and being shared by two of said rings, whereby four triple-connected nodes are formed at the end connection points of said branches, each of said nodes enabling a connection of one of said remote sources/loads and each of said nodes being isolatable from all of the other said nodes by an opening of a maximum of three of said switching means, each of the four triple-connected nodes being replaced by the three terminals of a three-phase source/load element and the six of said branches being constructed for operation at single phase to form two "a"-phase, two "b"-phase and two "c"-phase branches connected between said source/load element terminals having like phases and wherein each said single-phase branch has single conductive path means.

22. The distributed switching network as defined in claim 21 including an additional switching means in at least one of said branches to provide a double-connected source/load connection point or node between said addition switching means and said one switching means in said one branch, said double-connected point being isolatable from the remainder of said network by an opening of said additional switching means and said one switching means in said one branch.

23. The distributed switching network as defined in claim 21, including additional switching means connected in series in each of said branches, whereby additional double-connected source/load connection points or nodes are provided between pairs of said switching means and wherein said nodes are isolatable from the remainder of said network by an opening of appropriate pairs of said switching means.

24. A distributed switching network comprising a plurality of remotely located sources/loads, six conducting branches extending between said remotely located sources/loads, each of said branches containing at least one switching means, said branches being connected at their ends to form four 3-sided rings, each of said branches forming one side of and being shared by two of said rings, whereby four triple-connected nodes are formed at the end connection points of said branches, each of said nodes enabling a connection of one of said remote sources/loads and each of said nodes being isolatable from all of the other said nodes by an opening of a maximum of three of said switching means, each of the four triple-connected nodes being replaced by the three terminals of a three-phase source/load element and the six of said branches being constructed for operation at single phase to form two "a"-phase, two "b"-phase and two "c"-phase branches connected between said source/load element terminals having like phases and each said single-phase branch has double-parallel conductive path means with the ends of said double conductive path means being connected together to form a conductive ring.

25. The distributed switching network as defined in claim 24 including an additional switching means in at least one of said branches to provide a double-connected source/load connection point or node between said additional switching means and said one switching means in said one branch, said double-connected point being isolatable from the remainder of said network by an opening of said additional switching means and said one switching means in said one branch.

26. The distributed switching network as defined in claim 24, including additional switching means connected in series in each of said branches, whereby additional double-connected source/load connection points or nodes are provided between pairs of said switching means and wherein said nodes are isolatable from the remainder of said network by an opening of appropriate pairs of said switching means.

* * * * *